US010521498B2

(12) United States Patent
Pereira Filho et al.

(10) Patent No.: US 10,521,498 B2
(45) Date of Patent: Dec. 31, 2019

(54) SYSTEMS AND METHODS FOR MANAGING SUGGESTED EDITS IN A COLLABORATIVE DOCUMENT EDITING ENVIRONMENT

(71) Applicant: Google Inc., Mountain View, CA (US)

(72) Inventors: Luiz Do Amaral De Franca Pereira Filho, Jersey City, NJ (US); Steven Joseph Saviano, Brooklyn, NY (US); Kevin Markman, New York, NY (US); Thomas John Schirripa, New York, NY (US); Isaac Quinn Shum, New York, NY (US); Kevin Winter, Metuchen, NJ (US); Ian Gunn, Potts Point (AU); Stephen Alexander Garcia-Wright, Long Island City, NY (US); Olga Sergeyevna Saviano, New York, NY (US); Venkat Ganesan, Brooklyn, NY (US); Augustin O. Venezuela, III, Jersey City, NJ (US)

(73) Assignee: GOOGLE LLC, Mountain View, CA (US)

( * ) Notice: Subject to any disclaimer, the term of this patent is extended or adjusted under 35 U.S.C. 154(b) by 259 days.

(21) Appl. No.: 14/749,368

(22) Filed: Jun. 24, 2015

(65) Prior Publication Data

US 2015/0370769 A1     Dec. 24, 2015

Related U.S. Application Data

(60) Provisional application No. 62/016,262, filed on Jun. 24, 2014, provisional application No. 62/016,456, (Continued)

(51) Int. Cl.
*G06F 7/04*     (2006.01)
*G06F 17/24*     (2006.01)
(Continued)

(52) U.S. Cl.
CPC .............. *G06F 17/24* (2013.01); *G06F 16/93* (2019.01); *G06F 17/21* (2013.01); *G06F 17/241* (2013.01);
(Continued)

(58) Field of Classification Search
CPC ........ G06F 17/24; G06F 17/241; G06F 17/21; G06F 17/30011; G06F 21/6209; H04L 65/403
See application file for complete search history.

(56) References Cited

U.S. PATENT DOCUMENTS

2009/0077462 A1 *   3/2009   Kano .................. G06F 17/2247
                                                                715/234
2009/0249224 A1    10/2009   Davis et al.
(Continued)

OTHER PUBLICATIONS

Junuzovic et al., "Read, Write, and Navigation Awareness in Realistic Multi-View Collaborations," International Conference on Collaborative Computing: Networking, Applications and Worksharing, 2007, Collaboratecom 2007, IEEE, Piscataway, New Jersey, Nov. 12, 2007, pp. 494-503.

(Continued)

*Primary Examiner* — Shewaye Gelagay
*Assistant Examiner* — Carlton Johnson
(74) *Attorney, Agent, or Firm* — Lowenstein Sandler LLP

(57) ABSTRACT

A document editor may manage suggested edits in a collaborative document. The document editor may instantiate a document model associated with the collaborative document. When a first editing suggestion is received for the collaborative document, a first suggestion command is associated with the first editing suggestion based on a type of the first editing suggestion and a type of the document model. The document editor may apply the first suggestion command on the document model to present the first editing suggestion within the collaborative document. When an (Continued)

acceptance indication for the first editing suggestion is received, the document model can be updated with the first suggestion command in response to the received acceptance indication.

20 Claims, 11 Drawing Sheets

Related U.S. Application Data filed on Jun. 24, 2014, provisional application No. 62/016,466, filed on Jun. 24, 2014, provisional application No. 62/016,280, filed on Jun. 24, 2014, provisional application No. 62/016,451, filed on Jun. 24, 2014, provisional application No. 62/016,259, filed on Jun. 24, 2014.

(51) Int. Cl.
*G06F 21/62* (2013.01)
*H04L 29/06* (2006.01)
*G06F 16/93* (2019.01)
*G06F 17/21* (2006.01)

(52) U.S. Cl.
CPC ........ *G06F 21/6209* (2013.01); *H04L 65/403* (2013.01)

(56) References Cited

U.S. PATENT DOCUMENTS

| | | | |
|---|---|---|---|
| 2010/0235763 A1* | 9/2010 | Massand | G06F 17/2229 715/753 |
| 2012/0030563 A1* | 2/2012 | Lemonik | G06F 17/248 715/255 |
| 2012/0278401 A1 | 11/2012 | Meisels et al. | |
| 2014/0033015 A1* | 1/2014 | Shaver | G06F 17/241 715/233 |

OTHER PUBLICATIONS

Masoodian et al., "Recoled: A Group-Aware Collaborative Text Editor for Capturing Document History," Proceedings of IADIS International Conference on WWW/Internet 2005, Lisbon, Portugal, Oct. 19-22, 2005, vol. 1, pp. 323-330.
Murray et al., "Microsoft® Office Word 2007 Inside Out—Revising Documents Using Markup Tools," Chapter 19, Microsoft Press, Redmond, Washington, Jun. 20, 2007, pp. 523-559.
Nichols et al., "High-Latency, Low-Bandwidth Windowing in the Jupiter Collaboration System," UIST '95, 8th Annual Proceedings of the ACM Symposium on User Interface Software and Technology, Pittsburgh, Pennsylvania, Nov. 14-17, 1995, pp. 111-120.
International Search Report and Written Opinion dated Oct. 21, 2015, on application No. PCT/US2015/037446.

* cited by examiner

SYSTEMS AND METHODS FOR MANAGING
SUGGESTED EDITS IN A COLLABORATIVE
DOCUMENT EDITING ENVIRONMENT

CROSS-REFERENCES

This application is a non-provisional of, and claims priority to U.S. provisional application Nos. 62/016,259, 62/016,262, 62/016,280, 62/016,451, 62/016,456, and 62/016,466, all filed on Jun. 24, 2014.

This application is related to PCT international application Ser. No. PCT/US15/37446, filed on the same date, entitled "Systems and Methods for Managing Suggested Edits in a Collaborative Document Editing Environment".

The aforementioned applications are all herein expressly incorporated by reference.

FIELD OF THE INVENTION

In general, this disclosure relates to electronic documents, in particular, to systems and methods for managing suggested edits in a collaborative document editing environment.

BACKGROUND

During development of an electronic document, it is often desirable to have multiple reviewers propose changes to and comment on a draft of the electronic document. For example, an author may create an initial draft of an electronic document and send a copy of the electronic document to multiple reviewers for comments. Each reviewer may independently propose changes or make comments in the electronic document and return a revised version of the electronic document back to the author. These steps may be repeated until the author and the reviewers are satisfied with a version of the electronic document. However, this process is time consuming and inefficient.

SUMMARY

Systems and methods disclosed herein provide a document editor platform to manage suggested edits in a collaborative document. The document editor may instantiate a document model associated with the collaborative document. When a first editing suggestion is received for the collaborative document, a first suggestion command is associated with the first editing suggestion based on a type of the first editing suggestion and a type of the document model. The document editor may apply the first suggestion command on the document model to present the first editing suggestion within the collaborative document. When an acceptance indication for the first editing suggestion is received, the document model can be updated with the first suggestion command in response to the received acceptance indication.

BRIEF DESCRIPTION OF THE DRAWINGS

The above and other features of the present disclosure, including its nature and its various advantages, will be more apparent upon consideration of the following detailed description, taken in conjunction with the accompanying drawings in which.

DETAILED DESCRIPTION

To provide an overall understanding of the systems and methods described herein, certain embodiments will now be described, including a system and method for managing suggested edits in an editing environment. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof. Generally, the computerized systems described herein may comprise one or more engines, which include a processing device or devices, such as a computer, microprocessor, logic device or other device or processor that is configured with hardware, firmware, and software to carry out one or more of the computerized methods described herein.

Figure 1:
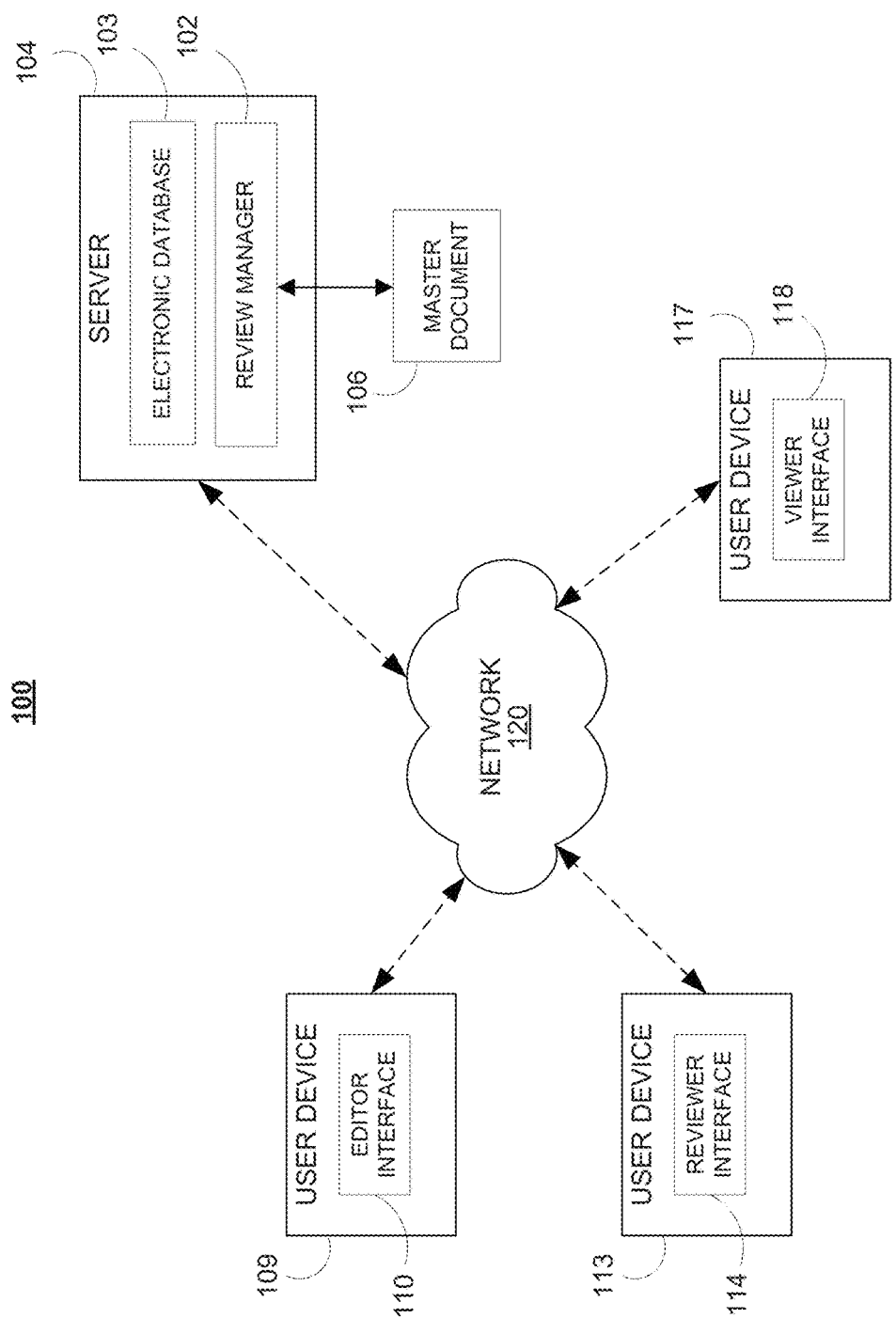
FIG. 1 is a diagram of a computerized system 100 for providing a collaborative document environment, according to an illustrative embodiment.

FIG. 1 is a diagram of a computerized system 100 for providing a collaborative document environment, according to an illustrative embodiment. System 100 includes a server 104 and three user devices 109, 113, and 117 connected over a network 120. The server 104 includes an electronic database 103 and a review manager 102, which manages updates to various versions of a master document 106. The master document 106 may be stored on the electronic database 103 on the server 104, or in a separate storage device.

To make the process of collaborating on electronic documents more efficient, a collaborative document editing environment is provided for integrating collaboratively proposed changes of an electronic document. In the collaborative document editing environment, users at different user devices may simultaneously access the master document 106 to review the document and propose changes. Each user is associated with a user type (such as an editor, a reviewer, or a viewer for example), which defines a level of authority for access to and editing capabilities of various versions of the document. As is shown in FIG. 1, an editor at the user device 109 may interact with the master document 106 over the editor interface 110, a reviewer at the user device 113 may interact with the master document 106 over the reviewer interface 114, and a viewer at the user device 117 may interact with the master document 106 over the viewer interface 118.

A reviewer of a document may view, make suggested edits, and provide comments on the document, but may not have permission to accept or reject any of the suggested edits. The reviewer may further view suggested edits and comments provided by other reviewers of the document. An editor has a greater level of authority for the document than the reviewer, and may accept or reject any suggested edit, and may also delete any comments made by the reviewer. Moreover, the editor also has access to make direct changes to the document by directly editing or making comments on the document. The edits received from an editor may be treated as accepted edits. A viewer of the document has a lower level of authority than the reviewer, and may only view a clean published version of the document, not including any indication of the suggested edits or comments. In an example, when an editor views the document, the editor may view a live stream of collaborative updates made by multiple reviewers at the same time, significantly reducing the amount of time to develop the document. In this manner, by allowing for efficient collaboration across a set of users proposing changes to a document, the systems and methods disclosed herein offer significant advantages over a system in which reviewers independently propose changes to a document.

Applications may want to allow changes to be tracked as suggestions, requiring them to be accepted or rejected before they are incorporated into the document. Doing so requires representing those changes in such a way where they are separable from the underlying model of the collaborative document, and allowing different changes to be associated with the same suggestion.

Figure 2A:
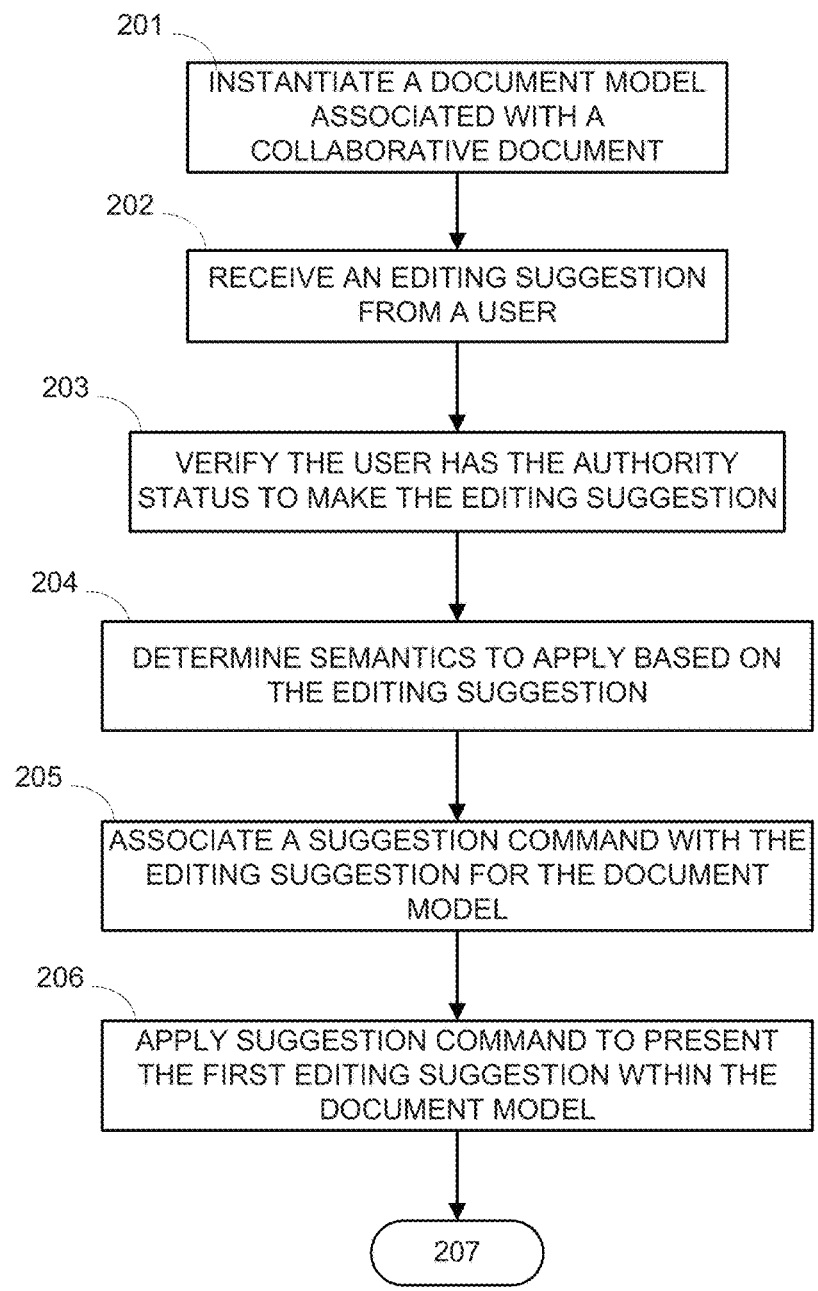
FIGS. 2A-2B provide an example logic flow diagram illustrating aspects of managing suggested edits within a document model, according to an illustrative embodiment.
Figure 2B:
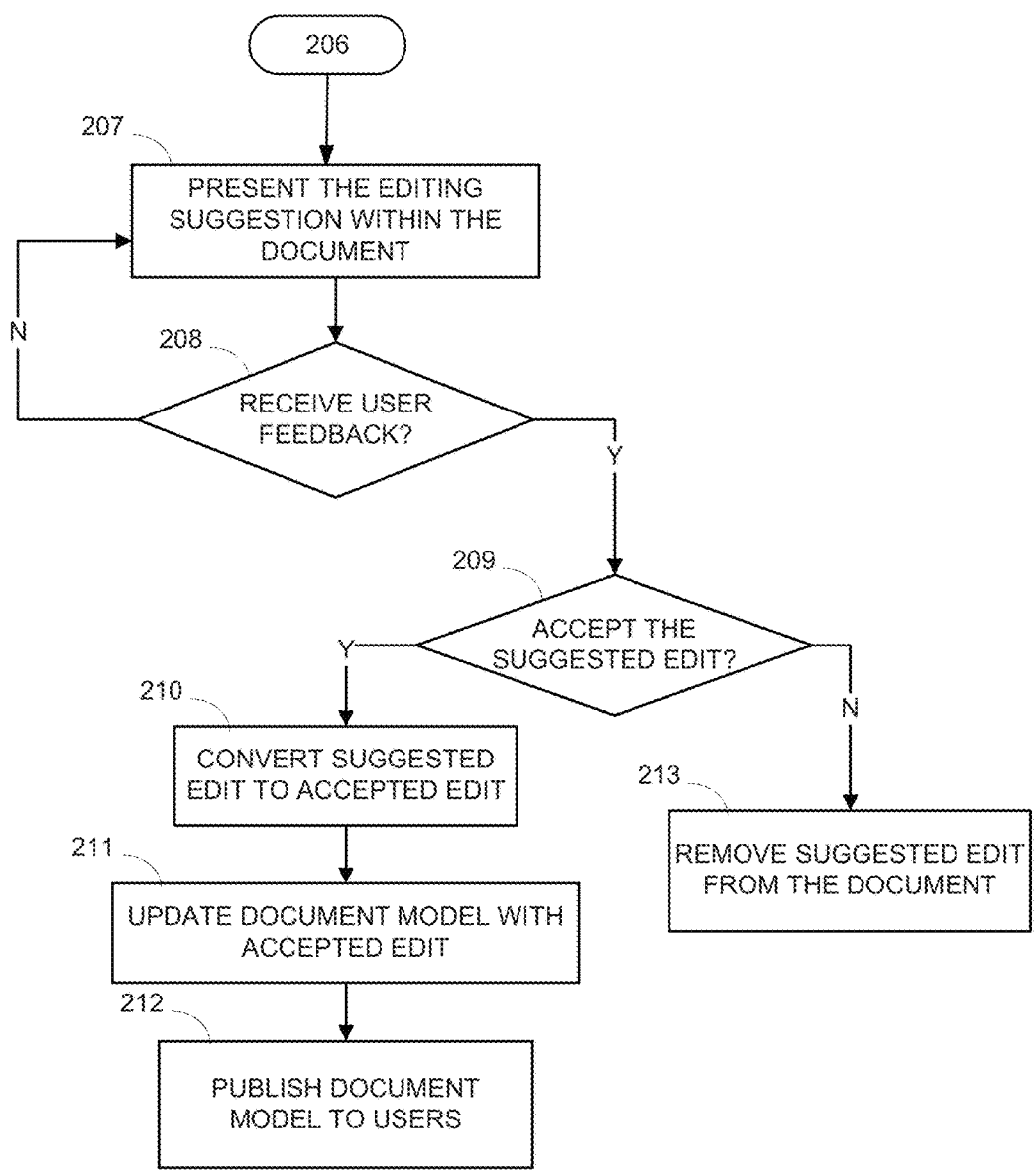

FIGS. 2A-2B provide an example logic flow diagram illustrating aspects of managing suggested edits within a document model. Starting at 201, a document model can be instantiated associated with a collaborative document. For example, the document model can be instantiated at a server (e.g., 104 in FIG. 1) to be associated with a master copy of the electronic document. Suggest changes can be received from a user via a user device (e.g., 109 in FIG. 1), at 202. The document model can introduce a document editing mode where document modifications are tracked as suggestions and can be accepted/rejected by editors. For example, the document model can verify whether a user has the authority level to make a suggested edit, e.g., whether the user is a reviewer, editor or viewer, at 203, and provide a "suggest" option to a user who is eligible to make a suggested edit on the collaborative document from a user device. This mode can replace a comment-only mode, allowing people with comment access to both make comments and make suggestions. In general, edits done by an editor can be doable by suggestors.

At 204, the server can determine semantics to apply based on the suggested edits. For example, suggestions can be represented in a model-specific manner. Generally, they are represented by annotating which parts of the model are suggested insertions/deletions/changes. For example, for a string text model, ranges of suggested insertions and deletions are kept. Commands can be thought of as acting within a certain addressable space. Examples include a spacer string or entity map, a list of slides or set of shapes for presentations. Given their addressable space, commands that can be included in a suggestor can be shown in Table 1 as below:

TABLE 1

Example Commands

| Command | Apply semantics | Examples |
| --- | --- | --- |
| Create | Insert object into space. | InsertSpacersMutation InsertCommand |
| Delete | Delete object from space. | DeleteCommand DeleteSpacersMutation |
| Modify | Modify property attached to the object. | ApplyStyleMutation ShapePropertiesCommand |
| Move | Move an object between two places in the space. | MovePageCommand |
| Replace | Replace an object with a different one within the same space. | None. Potentially could have some ReplaceSpacersMutation |

A suggestion command can be associated with the editing suggestion at 205. In order to support suggest changes, each command may have a corresponding suggestion command. When in a suggestions mode, the suggest version of the command is applied instead of the regular version of the command. Example semantics for the suggestion commands derived from the example commands shown in Table 1 can be shown in Table 2 below:

TABLE 2

Example Suggestion commands

| Command | Apply semantics | Suggest Semantics |
| --- | --- | --- |
| Create | Insert object | Insert object and mark it as a suggested insertion. |
| Delete | Delete object | Mark object as a suggested deletion. |
| Modify | Modify property attached to the object. | Modify property attached to object in a parallel space. |
| Move | Move an object between two places in the space. | Annotate object with new suggested position. |
| Replace | Replace an object with a different one within the same space. | Insert object and mark both inserted object and replaced object as suggested replacements of each other. |

As can be seen from the above, the suggestion command SuggestCreate can create the object, but also marks it as a suggested insertion. This means that suggested insertions affect the addressable space just like regular insertions—future commands assume the existence of the objects. Unlike regular deletion, SuggestDelete does not actually delete the object, but marks it for deletion. This allows for the original object to be addressed and modified until the suggestion is accepted or rejected. SuggestModify can keep around a set of parallel suggested properties for an object. Note that none of the framework commands need suggest versions. The document model may then apply the suggestion command to present the editing suggestion at 206.

Continuing on with FIG. 2B, after presenting the editing suggestion with the document model at 207, similarly to the suggestion commands, for each command there are corresponding accept and reject commands. Thus, when user feedback in response to the editing suggestion is received at 208, if an acceptance is indicated at 209, the document model can convert the suggested edit to accepted edit at 210, and update the document model at 211. An updated document based on the accepted edit can be published to the user at 212. Otherwise, if a rejection is indicated at 209, the editing suggestion can be removed from the document at 213. The example accept or reject semantics can be shown in Table 3 below:

TABLE 3

Example Accept/Reject Semantics

| Command | Apply semantics | Suggest semantics | Accept semantics | Reject semantics |
|---|---|---|---|---|
| Create | Insert object | Insert object and mark it as a suggested insertion. | Unmark as suggested insertion. | Delete object. |
| Delete | Delete object | Mark object as a suggested deletion. | Delete object. | Unmark as suggested deletion |
| Modify | Modify property attached to the object. | Modify property attached to object in a parallel space. | Modify property in real space and remove parallel modification. | Remove property modification in parallel space. |
| Move | Move an object between two places in the space. | Annotate object with new suggested position. | Remove annotation and actually move object to that position. | Remove annotation |
| Replace | Replace an object with a different one within the same space. | Insert object and mark both inserted object and replaced object as suggested replacements of each other. | Delete replaced object and unmark inserted object. | Delete inserted object and unmark replaced object. |

As can be seen in Table 3, the AcceptCreate can unmark the object as a suggested insertion, making it the same as regularly inserted objects. The RejectCreate can delete the object. Similarly, AcceptDelete deletes the object and reject delete unmarks it as a suggested deletion. AcceptModify takes the parallel properties and moves them into the regular properties for that object. This overrides the regular properties and gets rid of the parallel properties. RejectModify can get rid of the parallel properties.

Every suggestion command has an id so that multiple commands can be conceptually linked together as a single suggestion. These ids are kept around in the model in the following form:

When objects are marked as a suggested insertion or deletion, that suggestion has an id attached to it. Objects may have multiple suggested insertion or deletion ids.

When properties of an object are suggested, they are modified in a parallel space. This space is tied to an id, so that multiple property changes within a single suggestion are kept together. Objects may have multiple property modification parallel spaces.

When moves are suggested, the object stays in place and is annotated with the new proposed index. This index is tied to a suggestion id, so that multiple suggestion ids can propose different move indices.

When replacements are suggested, a new object is inserted adjacent to the original one and both are annotated as replacements for each other. These replacement annotations would be tied to suggestion ids.

Additionally, commands for accepting and rejecting suggestions also have an id. This id allows a user to specify which suggestion is actually being accepted/rejected for the cases where there are multiple suggestions proposing the same deletion or same property change. Note that suggestion ids are sufficient to identify what is being accepted or rejected for application purposes.

However, the full command data, such as the spacer ranges, may be needed in order to properly transform against these commands.

The following example provides example commands, for SuggestCreate and SuggestDelete:

1. Suggest the insertion of some text:
   a. SuggestInsertSpacers(id: "a", index: 5, spacers: "hello")
2. Suggest the deletion of some text:
   a. SuggestDeleteSpacers(id: "b", start: 10, end: 20)
3. Accept the first suggestion:
   a. AcceptInsertSpacers(id: "a", start: 5, end: 9)
4. Reject the second suggestion:
   a. RejectDeleteSpacers(id: "b", start: 10, end: 20)

In another example, an application of SuggestModify can be illustrated in the following Table:

TABLE 4

Examples of Suggest Functions

| Command | Resulting Model After Application |
|---|---|
| Apply font size 15:<br>ApplyStyleMutation<br>  1. type: "text"<br>  2. range: [5, 10]<br>  3. properties:<br>    a. {size: 15} | TextStyle @ [5, 10] {<br>properties: {<br>size: 15<br>}<br>suggested properties: { }<br>} |
| Suggest applying font size 20:<br>SuggestApplyStyleMutation<br>1. id: "a"<br>2. type: "text"<br>3. range: [5, 10]<br>4. properties:<br>a. {size: 20} | TextStyle @ [5, 10] {<br>properties: {<br>size: 15<br>}<br>suggested properties: {<br>"a": { size: 15 }<br>}<br>} |
| Someone else suggests applying font size 10.<br>SuggestApplyStyleMutation<br>1. id: "b"<br>2. type: "text"<br>3. range: [5, 10] | TextStyle @ [5, 10] {<br>properties: {<br>size: 15<br>}<br>suggested properties: {<br>"a": { size: 15 }, |

TABLE 4-continued

Examples of Suggest Functions

| Command | Resulting Model After Application |
|---|---|
| 4. properties:<br>  a. {size: 10} | "b": {size: 10}<br>}<br>} |
| Accept the first suggestion.<br>AcceptApplyStyleMutation<br>1. id: "a"<br>2. type: "text"<br>3. range: [5, 10]<br>4. properties:<br>  a. {size: 20} | TextStyle @ [5, 10] {<br>properties: {<br>size: 20<br>}<br>suggested properties: {<br>"b": {size: 10}<br>}<br>} |
| Reject the second suggestion.<br>RejectApplyStyleMutation<br>1. id: "b"<br>2. type: "text"<br>3. range: [5, 10]<br>4. properties:<br>  a. {size: 10} | TextStyle @ [5, 10] {<br>properties: {<br>size: 20<br>}<br>suggested properties: { }<br>} |

Inversion of suggest, accept and reject commands can be performed. As they are regular commands, suggest, accept and reject commands need inverses to support undoing these operations. Suggest and reject commands are inverses of each other, since suggest creates a suggestion and reject gets rid of it, as shown in the following table:

TABLE 5

Example Reject Semantics

| Command | Suggest semantics | Reject semantics |
|---|---|---|
| Create | Insert object and mark it as a suggested insertion | Delete Object |
| Delete | Mark object as a suggested deletion | Unmark as suggested deletion |
| Modify | Modify property attached to object in a parallel space. | Remove property modification in parallel space. |
| Move | Annotate object with new suggested position. | Remove annotation. |
| Replace | Insert object and mark both inserted object and replaced object as suggested replacements of each other. | Delete inserted object and unmark replaced object. |

However, apply may not have a natural inverse. This means that new commands may be needed to invert applying a suggestion. These commands do not have inverses. Alternatively, the inverse of an accept can be modeled as the inverse of the original command plus a suggest of the original command. Here a tradeoff between number of commands may be observed having good OT semantics for these commands. The following table shows the inverse semantics for each accept command and how to model it as the inverse of the original plus a suggest.

TABLE 6

Example Inverse of Accept Semantics

| Command | Accept semantics | Inverse accept semantics | Inverse of original plus suggest |
|---|---|---|---|
| Create | Unmark as suggested insertion. | Mark as suggested insertion. | Remove object (Delete). Insert object and mark it as a suggested insertion (SuggestCreate). |
| Delete | Delete object. Insert object and mark for deletion. | Insert object (Create). | Mark for deletion (SuggestDelete). |
| Modify | Modify property in real space and remove parallel modification. | Restore original property in real space and restore parallel modification. | Restore original property (Modify). Modify property in a parallel space (SuggestModify). |
| Move | Remove annotation and actually move object to that position. | Restore object to its original location and restore the suggested move | Restore object to its original location (Move). Restore the suggested move annotation. |
| Replace | Delete replaced object and unmark inserted object. | Restore replaced object and mark replaced and original as suggested replacements. | Replace inserted object with the original object (Replace). Insert object again and annotate objects as suggested replacements (SuggestReplace). |

As can be seen above, generally SuggestModify stores the proposed properties separate from the actual properties. However, if the properties include a nested addressable space, such as a list, this may be problematic. For example, the ParagraphStyle in contains an array of tab stops. When someone suggested the insertion (or deletion) of a tab stop, the same behavior as regular create/delete may be nedded, for the same reasons. So suggesting the insertion of a tab stop needs to insert it into the actual list and mark it as inserted. Suggesting the deletion of a tab stop needs to mark it as deletion. Therefore, applying SuggestModify can apply the property in a parallel space only if it's not within a nested addressable space. Otherwise it uses the overall semantics.

TABLE 7

Example - Tab Stops

| Command | Resulting Model After Application |
|---|---|
| Insert a regular tab stop:<br>ApplyStyleMutation<br>1. type: "paragraph"<br>2. paragraph index: 5<br>3. properties:<br>b. insert into "TabStops"<br>c. index: 0<br>d. properties: {offset:50} | ParagraphStyle @ 5 {<br>properties: {<br>tab_stops: [{offset: 50}]<br>}<br>suggested properties: { }<br>} |
| Suggest modifying the offset of that tab stop:<br>SuggestApplyStyleMutation<br>1. id: "a"<br>2. type: "paragraph"<br>3. paragraph index: 5<br>4. properties:<br>a. modify "TabStops"<br>b. index: 0<br>c. properties: {offset: 100} | ParagraphStyle @ 5 {<br>properties: {<br>tab_stops: [{offset: 50}]<br>}<br>suggested properties: {<br>"a": [{offset: 100}]<br>}<br>} |
| Suggest inserting a tab stop:<br>SuggestApplyStyleMutation<br>1. id: "b"<br>2. type: "paragraph"<br>3. paragraph index: 5<br>4. properties:<br>a. insert into "TabStops"<br>b. index: 0<br>c. properties: {offset: 15} | ParagraphStyle @ 5 {<br>properties: {<br>tab_stops: ["b": {offset: 15},<br>{offset: 50}]<br>}<br>suggested properties: {<br>"a": [{ }, {offset: 100}]<br>}<br>} |
| Accept tab stop insertion:<br>AcceptApplyStyleMutation<br>5. id: "b"<br>6. type: "paragraph"<br>7. paragraph index: 5<br>8. properties:<br>d. insert into "TabStops"<br>e. index: 0<br>f. properties: {offset: 15} | ParagraphStyle @ 5 {<br>properties: {<br>tab_stops: [{offset: 15}, {offset: 50}]<br>}<br>suggested properties: {<br>"a": [{ }, {offset: 100}]<br>}<br>} |

Like all commands, suggestion commands are created on the client via the edit system. One of the goals of this integration is for individual edits not to be aware of suggestions. This helps minimize the overhead of supporting suggest changes for new features. The basic approach is to take each command that would have been applied by the regular Edit, produce the suggest version of the command and apply that instead. However, that exposes an issue: the semantics of the suggestion command are not equivalent to those of the regular command. For example, a SuggestDelete does not actually delete the object. Therefore, the Edit cannot rely on applying commands producing certain changes to the ModelState. To solve this, a copy of the original ModelState can be made and the regular editing function can be applied on that copy. This can provide that any assumptions by the Edit on how the ModelState changes will be correct. Then, the commands can be taken that were originally applied and produce the suggest version of each of them. However, due to the differing semantics, each suggestion command may be adjusted based on the previous suggestion commands. For example, commands produced by a DragDropEdit suggest can include:

1. DeleteSpacers(5, 10)
2. InsertSpacers "hello" @ 50

Suggest version of these commands can include:

1. SuggestDeleteSpacers(5, 10)
2. SuggestInsertSpacers "hello" @ 56

To produce the suggested version of the commands, the following may be performed:

1. Produce SuggestDeleteSpacers(5, 10) from DeleteSpacers(5, 10).
2. Produce the appropriate transform command from SuggestDeleteSpacers.
3. Produce SuggestInsertSpacers "hello" @ 50 from InsertSpacers "hello" @ 50.
4. Transform the SuggestInsertSpacers against the transform command, yielding SuggestInsertSpacers "hello" @ 56.

In one implementation, example object classes involved for a suggest-edit document environment may take a form similar to the following pseudo-code segment:

```
/** Provides suggest edits. */
class SuggestEditProvider(editProvider) {
Edit provideEdit(context) {
return new SuggestEdit(context, this.editProvider_.provide(context.copy( ))
}
boolean canApply(context) {
return this.editProvider_.canApply(context)
}
}
/** Applies the given edit as a suggestion. */
class SuggestEdit(context, edit) {
void applyInternal(args) {
var result = this.edit_.apply(args);
var id = String(Math.random( )); // Some random string.
var transformCommands = [ ];
for each command in result.getCommands( ) {
var suggestedCommand = this.commandSuggestor_.getSuggestedCommand(command, id);
var pair = this.transformer_.transformBoth([suggestedCommand], transformCommands);
transformCommands = pair.getCommands( );
suggestedCommand = pair.getCommandsToWin( );
transformCommands.push(
this.commandSuggestor_.getTransformSuggestCommand(suggestedCommand);
this.applyCommand(suggestedCommand);
}}
}
/** Creates suggestion commands out of regular commands. */
interface CommandSuggestor {
/**
* Gets the corresponding suggestion command for the given command, with the given
* suggestion id.
* This would be use for steps (1) and (3) in the example above.
```

```
*/
Command getSuggestCommand(command, id, model)
/**
* Given a suggestion command, returns a command to be used to transform future
* suggestions within the same Edit. This command will account for differing semantics
* between commands and suggestion commands as returned by getSuggestCommand.
* This would be used for step (2) in the example above.
*/
Command getTransformSuggestCommand(suggestCommand)
```

Accepting and rejecting suggestions are also done via edits: the AcceptEdit and the RejectEdit. These edits can only be performed by editors. They are triggered when accept/reject is chosen from the suggestion comment. The edit will be given the suggestion id to accept/reject, then it will inspect the model to determine what changes are tied to that id. The appropriate reject/accept commands can then be applied for those changes. Note that since this depends on inspecting the model and generating accept and reject commands, there will be no common implementation for these edits. Example object classes involved for a suggest acceptance or rejection may take a form similar to the following pseudo-code segment:

```
/** Accepts the suggestion with the given id. */
class AcceptEdit(context) {
void applyInternal(args) {
var id = args.getId( );
for each suggested insert with that id:
this.applyCommand(new AcceptInsertSpacersMutation(start, end, id));
for each suggested delete with that id (iterating backwards):
this.applyCommand(new AcceptDeleteSpacersMutation(start, end, id));
// Similarly for styles and entities.
}
}
/** Rejects the suggestion with the given id. */
class RejectEdit(context) {
void applyInternal(args) {
var id = args.getId( );
for each suggested delete with that id:
this.applyCommand(new RejectDeleteSpacersMutation(start, end, id));
for each suggested insert with that id (iterating backwards):
this.applyCommand(new RejectInsertSpacersMutation(start, end, id));
// Similarly for styles and entities.
}
}
```

In one implementation, suggestors can issue SuggestDeletes instead of regular Deletes so that the objects will be marked for deletion rather than actually deleted. However, if it is an object that was originally suggested by the same user, they are allowed to delete it. For example, if a user suggests the insertion of "teh cat", they can go in and fix their typo. This will be accomplished by returning the appropriate command from getSuggestedCommand, based on the current context. In order to allow for more restricted semantics, a separate delete command can be created for suggestors to issue and then use validation to ensure that they cannot delete arbitrary objects.

In one implementation, the access control list (ACL) associated with the document can be checked for Suggestions. For example, users in a comment role already have the ability to apply commands to the model, so that they can apply commands which track the location of their comments. However, there are restrictions on the commands that can be applied, via the CommandPermissionChecker interface. With suggest changes, it should be straightforward to maintain that check, since there is a specific set of commands which the suggestors can issue:

Suggestion commands, so they can make suggestions.

Reject commands, so they can undo suggestions (and possibly so they can reject their own edits).

The special delete command for deleting within suggestions.

MultiCommands and ReverseCommand (only containing other allowed commands).

NullCommand.

This will prevent suggestors from making any actual modifications to the document. However, one could imagine a more restrictive ACL checking mechanism where suggestors may be prevented from affecting each other's suggestions. This more restrictive check is not currently done for comments—commentors are permitted to apply commands for anchoring comments regardless of who actually owns that comment. Doing this more restrictive check would be complicated, since it would require knowledge of who owns each suggestion id, which is not stored as part of the document model. Instead, these commands can be relied upon not being issued by the UI and the ACL checks can be maintained based on the role rather than the individual.

Suggestions from different users, accounts, and/or suggestion ids, can be merged. When in suggestions mode, not all edits produce commands with new suggestion ids. For example, typing a sentence in multiple edits should produce a single suggestion. These are called merged suggestions. Since suggestions have to be accepted or rejected wholesale, merging determines that granularity. An example suggestion merger may be illustrated in the following example:

1. Type a character in suggestion mode:
   a. SuggestInsertSpacers(id: "a", index: 5, spacers: "h")
2. Type another character:
   a. SuggestInsertSpacers(id: "a", index: 6, spacers: "i")
      i. Note that the id is the same. Both insertions are now part of the same suggestion.
3. Accept the suggestion:
   a. AcceptInsertSpacers(id: "a", start: 5, end: 6)
4. or reject the suggestion:
   a. RejectInsertSpacers(id: "a", start: 5, end: 6)

Before applying a command, the model can be inspected to determine which suggestion, if any, that command would merge with. If all the commands in an edit yield suggestion ids owned by the current user, then those suggestion ids can be used. Otherwise a new suggestion id can be created. By examining each id in this way, cases such as drag/drop and find can be supported and replaced across suggestions. The following examples illustrate the merging process:

TABLE 8

Example Merged Suggestions

| Commands in the Edit | Merge id | Merge? | Result Suggestion command |
|---|---|---|---|
| ApplyStyle within suggestion A owned by the current user | A | Yes | SuggestApplyStyle(A) |
| ApplyStyle within regular text | Null | No | SuggestApplyStyle(new id) |
| ApplyStyle within suggestion B owned by someone else | B | No | SuggestApplyStyle(new id) |
| ApplyStyle across suggestion A and normal Text | Null | No | SuggestApplyStyle(new id) |
| 1) ApplyStyle within suggest A owned by the current user 2) ApplyStyle within suggest B owned by the current user | 1) A 2) B | Yes | 1) SuggestApplyStyle(A) 2) SuggestApplyStyle(B) |

An issue with this approach is that it requires calculating the merged suggestion data as the original edits are applied to the ModelState copy. The merged suggestion data is calculated before each unwrapped command is applied, like inversion. The merged suggestion data would also need to be returned out of the original edit, like the undo commands are. A mechanism implementing a similar pattern as used for inversion can be adopted to calculate and return the merged suggestion data. For example, a command pre-processor may be used for suggestion merger and the pre-processor can be adapted for inversion as well.

Another example implementation of the suggestion document model is to process compound suggestions. Compound suggestions are suggestions that are created within other suggestions. For example, one user proposes the insertion of a sentence and a different user proposes the insertion of a word within that sentence. From the editor model perspective, compound suggestions look just like two regular suggestions: with two independent, unique suggestion ids. If there is no special UI for compounding, then these suggestions will simply show up as two distinct suggestions in comments, but as overlapping regions in the Collaborative document, much like overlapping Comments currently. Editors would be able to accept the innermost suggestion independent from the outermost. This would behave the same as if editors just went ahead and made the changes themselves. When a special UI is used for compounding suggestions, the relationship between the suggestion ids can be stored in a different place. For example, the current UI proposes showing compound suggestion within a single Comment, so this relationship can be stored in the Comments.

To determine whether a suggested edit should compound with another edit, a mechanism similar to determining merging above can be used. Given the set of suggestion ids for each command, a similar heuristic can be used: if all the ids are the same and the suggestion is not owned by the current user, then the specific suggestion id can be compounded.

Another example implementation of the suggestion document model is to process alternate suggestions. Alternates are suggestions which conflict which each other. For example, if one user proposes the deletion of a sentence while another user proposes the insertion of a word within that sentence. No special storage for alternates is provided.

If a special UI for alternates is desired, the alternates can be detected on client-side by inspecting the model.

The document model can provide a UI to present suggestions to a user, e.g., a "view" mode. The document model under the "view" mode can read the state of the model suggestions and render appropriately. For example, it might determine that certain spacers are suggested insertions and render them in the collaborator color for the user who made the suggestion. Alternatively, it might determine that certain spacers are suggested deletions and render them both as struck through and with the appropriate color.

A suggestion may have data associated in comments and a comment will be shown for each suggestion. Comments will store the following basic data keyed off of the suggestion id:

1. The user who made the suggestion.
2. The suggestion timestamp.
3. Some metadata explaining what the suggestion is.
4. Whether the suggestion has been accepted or rejected.

Users are allowed to comment on suggestions just like on regular Comments.

Additionally, suggestions will have controls allowing editors to accept/reject them. When this happens the comment thread will be annotated much like resolve and reopening Comments. Suggestion comments will contain some text explaining what the suggestion did. This will be derived from the metadata. The metadata will be structured and app-specific, although some may be generic. Examples of possible metadata can take a form similar to the following:

{type: insert, text: "hello" }
{type: delete, text: "hello" }
{type: style, key: "font_size", value: 15}

Additional data can be stored to support compound suggestions. Copy and paste has additional consideration for what happens to the Comment data.

Another example implementation of the suggestion document model is to edit metadata. In order to generate the suggestion metadata the EditMetadata function can be invoked, which already serves this purpose for verbalizing Edits for accessibility. The EditMetadata gives details on what exactly the edit did. Class per Edit can be adopted, which takes the EditMetadata and produces the appropriate Comments metadata.

Regular edits in suggestions can be performed via the document model. Users in edit mode are allowed to affect anything, including suggestions. When an editor makes a change to a suggestion, that change is immediately committed—it is not compounded or created as a suggestion. In order to keep authorship trace of who's actually suggesting what, the comment may be annotated with some text explaining what the editor did. This can be done by creating the metadata for the edit and appending that to the comments thread for that suggestion.

Figure 3:
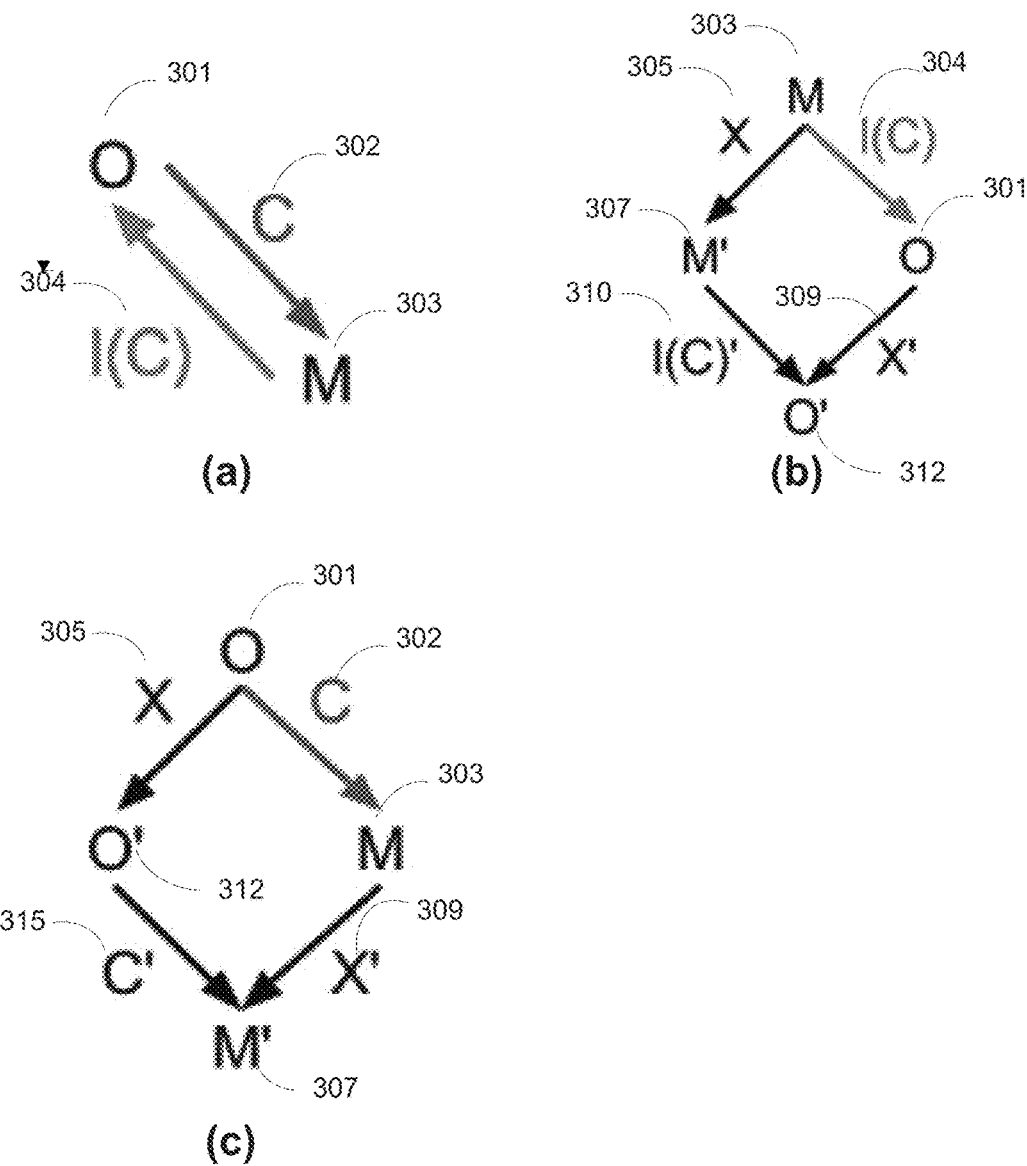
FIG. 3 provides example logic diagrams illustrating aspects of suggestion filtering procedures for a document model, according to an illustrative embodiment.

Another example implementation of the suggestion document model is to filter Suggestions. FIG. 3 provides example logic diagrams illustrating aspects of suggestion filtering procedures for a document model.

The document model O 301 can provide a mode where editors can filter out suggestions. These filters may be by user or suggestion type (insertions, styles, etc). To allow for flexibility in what exact filters can be supported, filtering can be allowed by applying any arbitrary set of commands and then transforming the client and server commands as they are transmitted back and forth. In order to create a filter, a command C 302 can be applied to the model O 301. This yields a new model M 303, which can be used for the client view and controller, and can allow the view and controller logic to remain the same regardless the filtering.

When creating the filter command C 302, the inverse I(C) 304 may also be created. Additionally, two models 301 and 303 can be maintained: the original model 301 before filtering and the new model 303 post filtering. These two models can facilitate to create the appropriate inverses when transforming.

The filtering algorithm may work in a manner similar to the following (shown at FIG. 3(*a*)):

1. Generate command the filter command C 302.
2. Generate the filter inverse command I(C) 304 via regular inversion.
3. Copy the model, keeping the original O 301 and the copy M 303, which will be the new model.
4. Apply command C 302 to the new model M 303.

Any commands generated by the client controller can be applied directly to M. In order to send those commands to the server, they need to be transformed against I(C). In one example, the full algorithm can be performed as follows (shown at FIG. 3(*b*)):

1. Apply command X 305 to model M 303. This yields the new model M' 307.
2. Transform X 305 against I(C) 304 to yield X' 309 and I(C)' 310.
3. Apply X' 309 to the original model O 301. This yields the new original model O' 312.
4. Send X' 309 to the server.
5. The new filter inverse command is now I(C)' 310.
6. Generate the new filter command by inverting I(C)' 310.

Similarly, any commands received from the server can be applied directly to O 301. In order to apply these clients to M 303, they may to be transformed against C 302. In one example, the full algorithm can be performed as follows (shown at FIG. 3(*c*)):

1. Apply command X 305 to original model O 301. This yields the new original model O' 312.
2. Transform X 305 against C 302 to yield X' 309 and C' 315.
3. Apply X' 309 to the model M 303. This yields the new model M' 307.
4. The new filter command is now C' 315.
5. Generate the new filter inverse command by inverting C' 315.

To unfilter the suggestion, I(C) 304 can be applied to the model M 303, which makes it now be equivalent to the original model O 301. Note that instead of applying the inverse, instead the model M 303 can be replaced with the original model O 301. This means that I(C) 304 may not need to be applied, and therefore omit commands can be used instead of inverses. In this way, the transformation layer may not be given access to the original model. However, the original model may be maintained up-to-date, as it can be used for unfiltering.

Another example implementation of the suggestion document model is to implement server changes. Suggestions are only visible to people in edit or comment mode. View, preview and published modes may not show suggestions. This may require logic similar to filtering on the server-side. The server may know how to produce a model with suggestions stripped out and when that model should be used instead of the regular model. Examples where suggestions may be stripped out include:

1. View, preview and published modes.
2. Export.
3. Indexable text and thumbnailing.

Note that for some of the above, such as export and indexable text, different logic can be implemented depending on the access level, to prevent the loss of functionality.

Suggested insertions are represented by marking a range of text with a suggested insertion id. Paragraph insertions are represented similarly—the newline marker is marked for insertion.

Below is an example pseudo-code segment of inserting "hello" as a tracked change in an eXtensible Markup Language (XML) format.

```
<w:ins w:id="0" w:author="AUTHOR"
 w:date="2013-09-12T10:58:00Z">
<w:r>
<w:t>hello</w:t>
</w:r>
</w:ins>
```

The w:ins tag is used to indicate that its contents are tracked for insertion. The tag contains the id (w:id), author (w:author) and date (w:date) of the change. In the example above, the insertion contains a text run (w:r) with "hello" as its text (w:t). Below is an example pseudo-code segment of inserting a newline after "hello" as a tracked change in an XML format:

```
<w:p w:rsidR="009F5AAA" w:rsidRDefault="009F5AAA"
 w:rsidP="009F5AAA">
<w:pPr>
<w:rPr>
<w:ins w:id="0" w:author="AUTHOR"
 w:date="2013-09-12T10:58:00Z">
</w:rPr>
</w:pPr>
<w:r>
<w:t>hello</w:t>
</w:r>
</w:p>
```

The w:ins tag with no contents is used to indicate that the newline is tracked for insertion. The tag contains the id (w:id), author (w:author) and date (w:date) of the change.

Another example implementation of the suggestion document model is to process textual deletions. Suggested deletions are represented by marking a range of text with a suggested deletion id. Paragraph deletions are represented similarly—the newline marker is marked for deletion.

Below is an example pseudo-code segment of marking "hello" as a tracked deletion in an XML format

```
<w:del w:id="1" w:author="AUTHOR"
 w:date="2013-09-12T10:58:00Z">
<w:r w:rsidDel="00996D0B">
<w:delText>hello</w:delText>
</w:r>
</w:del>
```

The w:del tag is used to indicate that its contents are tracked for deletion. The tag contains the id (w:id), author (w:author) and date (w:date) of the change. In the example above, the deletion contains a text run (w:r) with "hello" as its text (w:delText). Below is an example pseudo-code segment of marking the newline after "hello" as a tracked deletion in an XML format.

```
<w:p w:rsidR="009F5AAA" w:rsidDel="00635749"
w:rsidRDefault="00635749" w:rsidP="009F5AAA">
<w:pPr>
<w:rPr>
<w:del w:id="1" w:author="AUTHOR"
w:date="2013-09-12T10:58:00Z"/>
</w:rPr>
</w:pPr>
<w:r>
<w:t>Deleted</w:t>
</w:r>
</w:p>
```

The w:del tag with no contents is used to indicate that the newline is tracked for deletion. The tag contains the id (w:id), author (w:author) and date (w:date) of the change.

Suggested text styles are represented via a map from suggestion id to the properties being suggested. This map is applied to a range of text. Below is an example pseudo-code segment of applying "bold" as a tracked change to "hello" in an XML format. That word is already italicized.

```
<w:r w:rsidR="006B2B93" w:rsidRPr="006B2B93">
<w:rPr>
<w:b/>
<w:i/>
<w:rPrChange w:id="2" w:author="AUTHOR"
w:date="2013-09-12T15:14:00Z">
<w:rPr>
<w:i/>
</w:rPr>
</w:rPrChange>
</w:rPr>
<w:t>hello</w:t>
</w:r>
```

There is an text run (w:r), with a run properties tag (w:rPr) and some text (w:t). The run properties contains the current properties, including the tracked change: bold (w:b) and italic (w:i). It also contains a run properties change tag (w:rPrChange) which contains the properties before the tracked style was applied, which is just italic (w:i). The properties change tag also contains the id (w:id), author (w:author) and date (w:date) of the change.

Suggested paragraph styles are represented via a map from suggestion id to the properties being suggested. This map is applied to the paragraph's newline. Below is an example pseudo-code segment of applying "center" as a tracked change to a paragraph containing "hello" in an XML format. The paragraph already had line spacing set on it.

```
<w:p w:rsidR="00ED223B" w:rsidRDefault="001243D1"
w:rsidP="001E67D7">
<w:pPr>
<w:spacing w:line="240" w:lineRule="auto"/>
<w:jc w:val="center"/>
<w:pPrChange w:id="4" w:author="AUTHOR"
w:date="2013-09-13T16:39:00Z">
<w:pPr>
<w:spacing w:line="240" w:lineRule="auto"/>
</w:pPr>
</w:pPrChange>
</w:pPr>
<w:r>
<w:t>hello</w:t>
</w:r>
</w:p>
```

There is a paragraph run (w:p), with a paragraph properties tag (w:pPr) and a text run (w:r). The paragraph properties contain the current properties, including the tracked change: line spacing (w:spacing) and alignment (w:jc). It also contains a run properties change tag (w:pPrChange) which contains the properties before the tracked style was applied, which is just line spacing (w:spacing). The properties change tag also contains the id (w:id), author (w:author) and date (w:date) of the change.

Suggested list styles are represented via a map from suggestion id to the properties being suggested. This map is applied to the paragraph's newline. Suggested changes that affect the list entity are also represented via a map from suggestion id to properties. This map is applied at the list entity.

Below is an example pseudo-code segment of adding the paragraph containing "hello" to a list as a tracked change in an XML format.

```
<w:p w:rsidR="006F3E3C" w:rsidRDefault="006F3E3C"
w:rsidP="006F3E3C">
<w:pPr>
<w:pStyle w:val="ListParagraph"/>
<w:numPr>
<w:ilvl w:val="0"/>
<w:numId w:val="3"/>
</w:numPr>
<w:pPrChange w:id="6" w:author="AUTHOR"
w:date="2013-09-13T16:39:00Z">
<w:pPr/>
</w:pPrChange>
</w:pPr>
<w:r>
<w:t>five</w:t>
</w:r>
</w:p>
```

There is a paragraph run (w:p), with a paragraph properties tag (w:pPr) and a text run (w:r). The paragraph properties contain the current properties, including the tracked change: applying the "ListParagraph" named style (w:pStyle), and adding the paragraph to the list id "3" (w:numId) at nesting level "0" (w:ilvl). It also contains a run properties change tag (w:pPrChange) which contains the properties before the tracked style was applied, which is empty (w:pPr/). The properties change tag also contains the id (w:id), author (w:author) and date (w:date) of the change.

Another embodiment described herein include systems and methods to merge suggested edits within a collaboratively edited document. A document editor may allow users to make edits as suggestions, which may be tracked and are accepted or rejected before being incorporated into the document. These suggestions exist as distinct changes to the document which can be independently accepted and rejected. As a user makes individual actions to edit the document, such as typing characters, it is not desirable for those actions to each individually produce a separate suggestion. In particular, when a reviewer of a document opens the document and creates suggested edits to the document, not all edits should produce commands with new suggestion identifiers. For example, typing a sentence in multiple edits should produce a single suggestion. These are called merged suggestions because the single suggestion arose from multiple edits or mutations. Since suggestions have to be accepted or rejected wholesale, merging determines the granularity for suggestions.

The systems and methods of the sixth exemplary embodiment of the present disclosure determine whether a current change to the model should be merged with an existing suggestion, or whether such a change should create a new suggestion. The systems and methods of the present disclosure are generic enough to work well for any arbitrary change or collection of changes to a document model. Existing systems do not take the entire document model into account and do not maintain consistency and user intent.

Figure 4A:
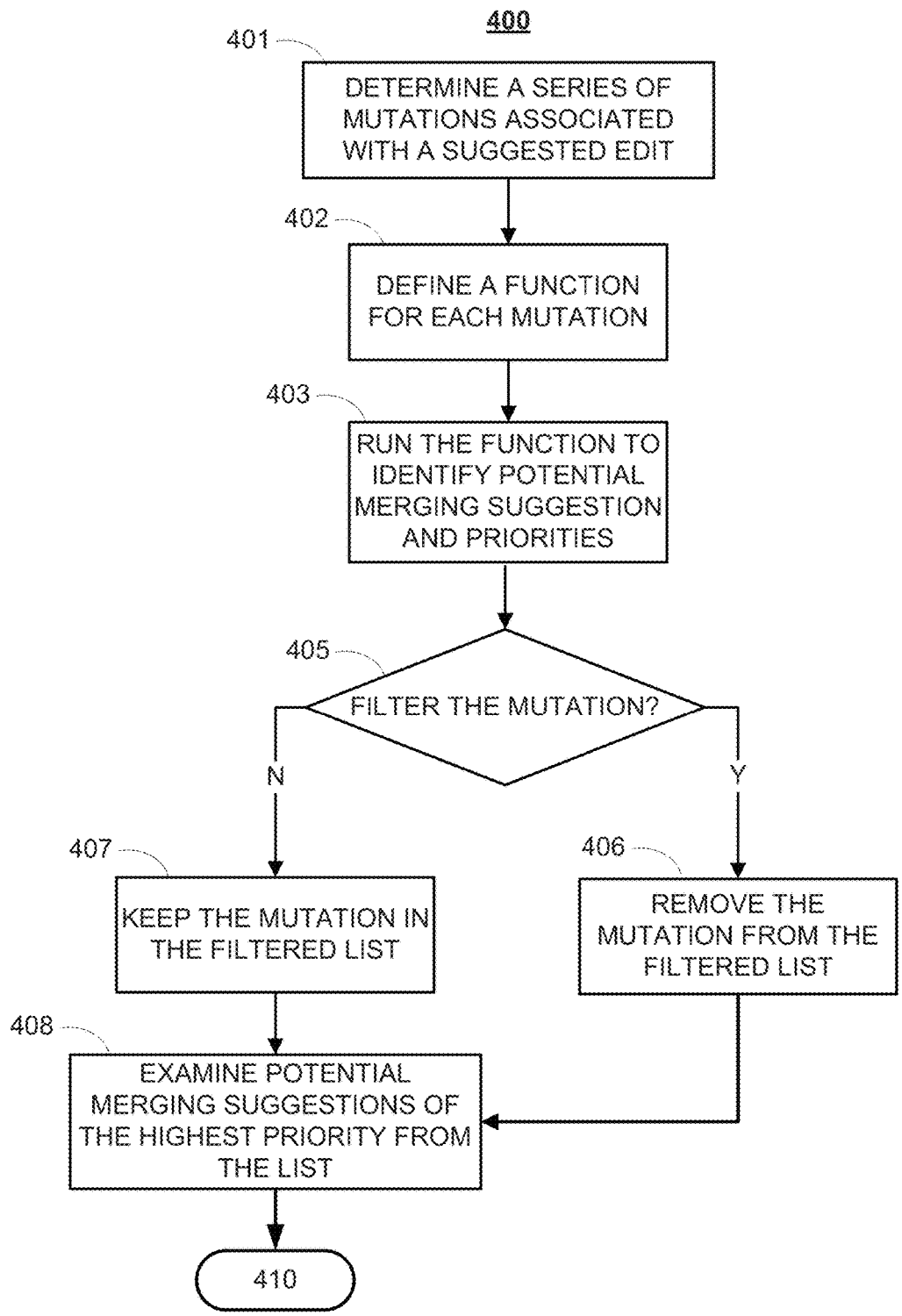
FIGS. 4A-4B show an example logic flow diagram 400 illustrating aspects of merging suggested edits, according to an illustrative embodiment.
Figure 4B:
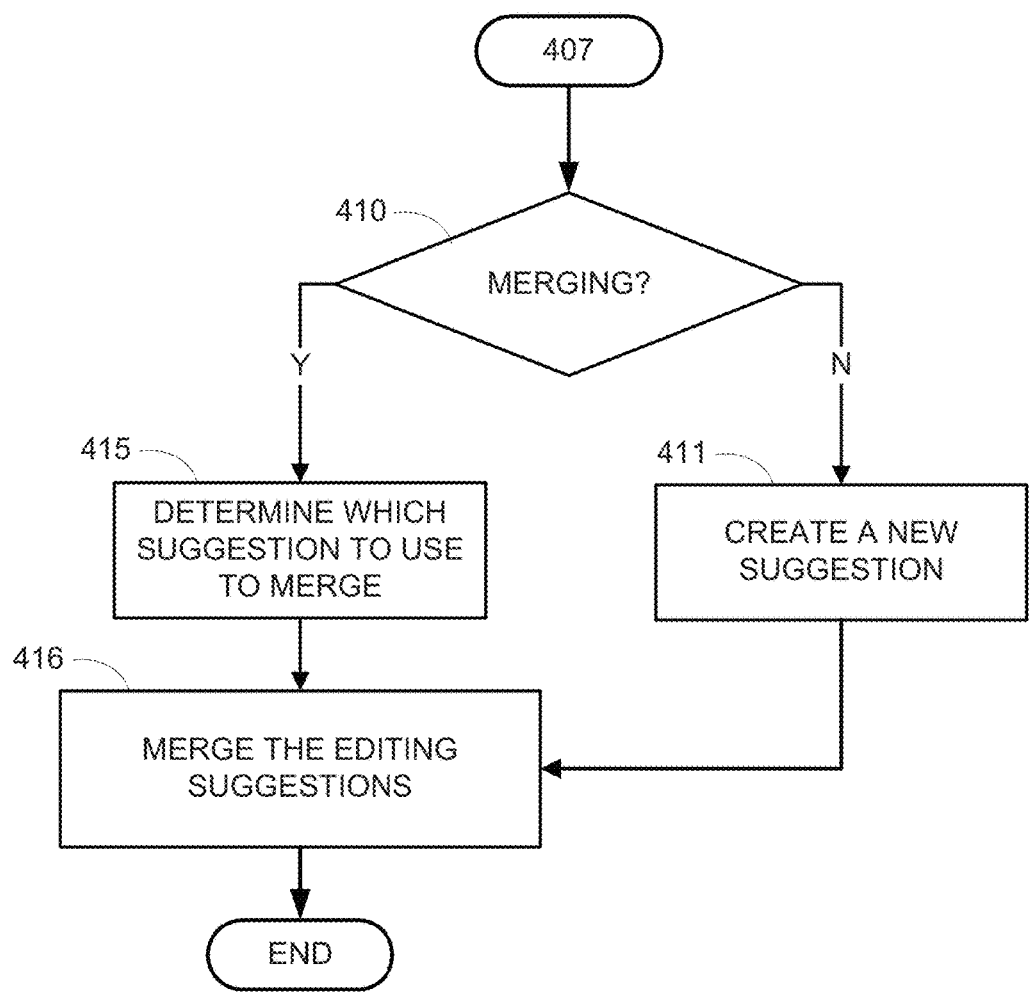

FIGS. 4A-4B show an example logic flow diagram 400 illustrating aspects of merging suggested edits. Starting at 401, in response to a received editing suggestion (e.g., 202 in FIG. 2A), a document editor on a server or a user device may determine whether to merge the received editing suggestion with existing editing suggestions, or to create a new suggestion. The document editor may determine one or more mutations associated with the editing suggestion. For example, changes to a document model may be described via a series of incremental atomic mutations. In a document editing environment, such as a text editor, mutations may include insert characters, deleting characters, applying styles, or any other type of change that may be made to a text document. A single suggested edit to the document may result in multiple mutations being applied to the model.

For example, the suggested edit may include adding a word or a phrase including multiple character insertions. In another example, the suggested edit may include replacing an existing phrase with a different phrase. Such a suggested edit would include multiple character deletions and multiple character insertion. In yet another example, the suggested edit may include inserting one or more characters, and applying a style change to the inserted characters. In each example, the suggested edit includes multiple mutations to the document. It is generally desirable, as mutations are received sequentially, to determine whether a current mutation should be merged with a previous mutation as part of a single edit, or whether a current mutation should be characterized as part of a new edit.

Systems and methods are provided herein for determining whether to merge a current change to a document with an existing suggested edit, or whether to generate a new suggested edit based on the current change. A document editor has logic for determining what mutations to apply to the document based on the user's action and the current state of the document editor.

The document editor may then define a function for each mutation, at 402. The function determines which suggestions a mutation may merge with. This function may be defined for the particular mutations and document models in the editing application. As an example, in a document editor, the mutation to insert characters may merge with any suggested text that occurs before, after, or around the inserted text.

Additionally, this function may determine a merge priority for the mutation. In an example, mutations are sorted in an order of priority, so that more drastic changes to the document may be considered before less drastic changes. For example, if a suggested edit includes both insertion of text and application of a style, the location of the insert may be a more likely candidate for merging than the location of the style application. In this case, the insert mutation may be prioritized over the style application mutation.

As mutations are being applied to the model, the function is run to identify a list of any potential merging suggestions and priorities, at 403. Then, the document model may determine whether any mutation needs to be filtered from the list, at 405. For example, any suggestions that are not owned by the current user may be removed or filtered from the list, at 406. Filtering the list in this manner ensures that suggestions made by a current user do not merge with suggestions made by other users, and instead create new suggestions owned by the current user. Alternatively, the function may include one or more filters so that any potential merging suggestions priorities in the list identified by the function are only associated with the current user and not other users.

In general, in determining whether to merge suggested edits, the insertion and deletion of regular text has the highest priority. The suggestions that insertions and deletions of text may merge with are defined according to the heuristics above. Specifically, insertions return suggestions to merge for inserts or deletes before or after the insert location. Deletions return suggestions to merge for any deletions or insertions before, after or inside the deleted range. Style related changes have secondary priority. This includes text and paragraph styles, modifications to lists and links, for example. These edits merge only if the styled range is fully contained within a deletion or insertion. They also merge with other suggested styles if the range is the same or if inside other styles and affecting the same properties. Deletion of secondary text has secondary priority and merges with other deletions of the same text. Secondary text is text outside the main body of the document, which is generally related to the document, such as headers, footers, footnotes, for example. Insertion of secondary text has the lowest priority and returns no merge suggestions. This text will always produce a new suggestion (such as in the case of headers and footers) or it is related to primary text, such as footnotes, and therefore will use the primary text merging heuristics.

In determining how to merge suggested edits, the method of the exemplary embodiment may include a framework of categories defining the priority associated with merges that fall within the category. Each suggestion can be assigned a merge suggestion identifier that identifies the suggested action as well as the priority category of the suggested change. These priority categories are divided into example categories of primary, secondary and neutral priority merges depending on the priority with which the suggested edit is merged.

In an example, the primary priority category includes suggestions such as insertions and deletions of non-section spacers. Secondary priority category suggestions include applying a different style to document text; tethering, updating or deleting an entity; or deleting a section. Neutral priority category suggestions include inserting a section, adding an entity and various other suggestion commands.

Continuing on with FIG. 4B, after the filtered list is determined at 407, all potential merging suggestions of the highest existing priority are examined at 408, to determine whether merging should happen at 410. If all mutations at that priority have matching suggestions, then merging happens. Otherwise, merging should not happen and a new suggestion is created at 411.

If merging happens, then the system and method described herein determine which suggestion of the potential suggestions in the filtered list should be used to merge at 415. A number of ways may determine which suggestion should be used to merge, and the examples described herein are for illustrative example only.

In one example, suggestions that are more common may be preferred to be used to merge. One particular way is to prefer more common suggestions. Several steps may be used to implement this. First, a histogram indicative of how often each suggestion occurs is created. Second, the mutations are considered from most common to least common, and any mutations that may merge with a particular suggestion may be used. Third, for any mutation that does not have a potential merging suggestion, then the most commonly occurring suggestion with the highest priority is used. Upon determining which suggestion to be used to merge, the editing suggestions may be merged at 416.

As described herein, one goal of the present disclosure is to define a mechanism to merge suggestions together across different edits, and to determine a mechanism of gathering this merge data as the suggested edits are applied to the document model. The below example provides an implementation of the system when two characters being typed, and the system determines that the two characters belong together in the same suggestion:
1. Type a character in suggestion mode:
   a. SuggestInsertSpacers(id: "a", index: 5, spacers: "h")
2. Type another character:
   a. SuggestInsertSpacers(id: "a", index: 6, spacers: "i")
   i. Note that the id is the same. Both insertions are now part of the same suggestion.
3. Accept the suggestion:
   a. AcceptInsertSpacers(id: "a", start: 5, end: 6)
4. Or reject the suggestion:
a. RejectInsertSpacers(id: "a", start: 5, end: 6)

Before applying a command, the document model may determine which suggestion, if any, that command would merge with (e.g., at 415 in FIG. 4B). If all the commands in an edit are associated with suggestion identifiers that are owned by the current user, then those suggestion identifiers may be used. Otherwise, a new suggestion identifier may be generated and used. By doing this per identifier, changes including cut/paste or find/replace may be efficiently implemented.

In another example, based on priority categories assigned to suggested edits, the basic heuristics include to complete the merging of suggestions when typing after/before/inside an insertion, typing after/before/inside a deletion, typing before a newline with a suggested text style, deleting before/after/inside/around a deletion, deleting before/after/inside/around an insertion, entering inside a deletion, entering after/before/inside an insertion, changing styles inside an insertion, changing styles inside a deletion, changing styles applied to the exact same range as another style, changing styles inside other styles, if affecting the same properties, or altering the text styles applied to a newline after a suggested insertion. Suggestions are not merged when typing after/before/inside styles, deleting before/after/inside/around styles, entering before/after delete, entering before/after replace, changing styles before/after an insertion, changing styles before/after a deletion, changing styles overlapping insertions, changing styles overlapping deletions, or altering the styles inside, before, after, or overlapping with other styles that are not within the same range.

There are two special cases to consider around newlines and text styles: typing before a newline with a suggested text style and text styles applied to a newline after a suggested insertion. These special cases are implemented in a similar manner as described above: the insertion merging logic checks whether the insertion is before a newline with a suggested text style and the style merging logic checks whether the style is applied to a newline after a suggested insertion. These cases produce a solution for several issues. In one example, starting an empty paragraph with a non-suggested newline is not problematic. In a second example, pressing "bold" while suggesting an edit applies a suggested style to the newline. In a third example, typing a character inserts a character before the newline. The suggestion to insert the character merges with the previous one.

Figure 5:
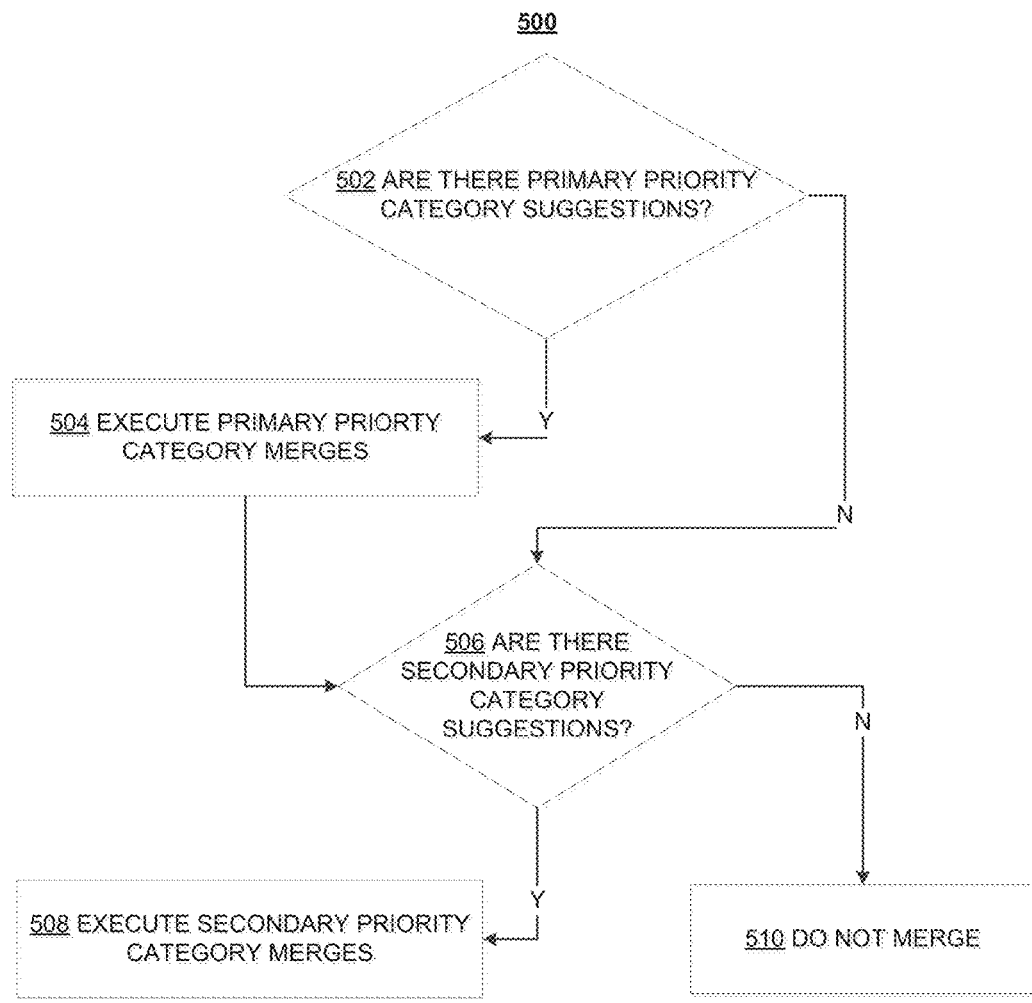
FIG. 5 shows a flow chart of a method 500 used by the review manager 102 to use the priority categories to determine the order in which to merge suggestions within a document.

FIG. 5 shows a flow chart of a method 500 used by the review manager 102 to use the priority categories to determine the order in which to merge suggestions within a document. The method 500 includes the steps of determining if there are any primary category suggestions (decision block 502) and determining if there are any secondary category ID commands (decision block 506) and merging suggested edits appropriately based on these outcomes. If there are primary priority category suggestions, these merges are executed (step 504). If there are secondary priority category merges, these are executed (step 508). Alternatively, if there are no secondary priority category suggestions, no further merges are made (step 510).

Merging suggested edits including insertions occur according to several rules. In one implementation, pressing ENTER in comment mode inserts separate comments for each newline. Typing multiple paragraphs result in a merged edit encompassing the suggested paragraphs.

In some cases multiple users may suggest various edits to a text, including suggestions which are conflicting. In cases of conflicting style suggestions, the suggestions should be merged into a single suggestion. In some implementations, editors may have the capability to undo, accept or reject the suggested conflicting edits and using these capabilities may cause all conflicting suggestions to disappear.

Suggested edits to paragraph styles are handled as separate from edits to the text of the paragraph. In one example, changing a suggested heading does not change the styles of the paragraph entities. In another example, the merge edits system is equipped to handle issues in which the suggestion to "add entity" never merges. In a third example, changing a suggested link does not always work.

In general, the method of determining whether to merge suggested edits is accomplished according to a series of principles. Single actions are always displayed as single suggestions. Merges are executed for style changes fully within insertions, style changes with the same entity selected, typing a continuous range of suggested text, typing inside of inserted text, and for objects which can be merged, including inline images, equations, autotext, footnotes, and bookmarks. In some insertions of tables, positioned images, headers, footers and tables of contents may not be merged with other edits.

The approach described herein has several advantages. First, suggestions made by a particular user may only merge with suggestions made by the same user. Second, a single user action would never create more than one suggestion. Third, consistency is maintained between mutations within an edit. In other words, all mutations either merge with existing suggestions or are assigned to a new suggestion. Fourth, consistency is maintained when a single edit affects multiple existing suggestions. By favoring suggestions that each mutation prefers to merge with, edits which affect multiple suggestions have their constituent mutations merge with the suggestions that they individually affect.

Another embodiments described herein include projections applied to a document model. Client systems or user devices may have projections applied to their document models. For example, projections may be used to strip out certain types of content or to anonymize certain parts of the document. Projections may be described in terms of mutations that are applied to the model. When a projection is applied to a model, mutations are produced which when applied generate the model under the projection. For example, a projection which strips out tables would produce a delete table mutation for each table, resulting a model with no tables.

In order to broadcast a mutation to a collaborator whose model is under a projection, that mutation should be transformed against the mutations which describe the projection. For example, broadcasting an insert text mutation to a model with some text filtered out requires transforming the insert text against delete text mutations corresponding to the filtered out text.

Additionally, some mutations should be entirely omitted when broadcasting under a projection. For example, if a projection removes tables from a document, then a mutation to create a new table should not be sent to clients with that projection. For individual mutations, this is simple to implement. In particular, those mutations to omit should be identified for certain projections, and the identified mutations should not be broadcasted.

However, omitting certain mutations may affect future mutations, since future mutations may rely on or assume the presence of the omitted mutations. For example, if two mutations are being broadcast (e.g., [insert text at index 100, insert text at index 200]), the second insertion may assume the first insertion was implemented. In this manner if the first insertion is omitted, and the second insertion is naively broadcasted, then the broadcasted insertion is at the wrong index.

To solve this, omit transform mutations are defined. Omit transform mutations are mutations against which future mutations need to be transformed to account for differing semantics due to the omission. In the example above, the omit transform mutation for [insert text at 100] is [delete text at 100]. By transforming the [insert text at 200] against the delete mutation, the [insert text at 200] is shifted back and will be at the right index. In this manner, the omit transform mutation allows for future mutations to take into account a projection of a document, and thus to be appropriately adjusted accordingly.

Figure 6:
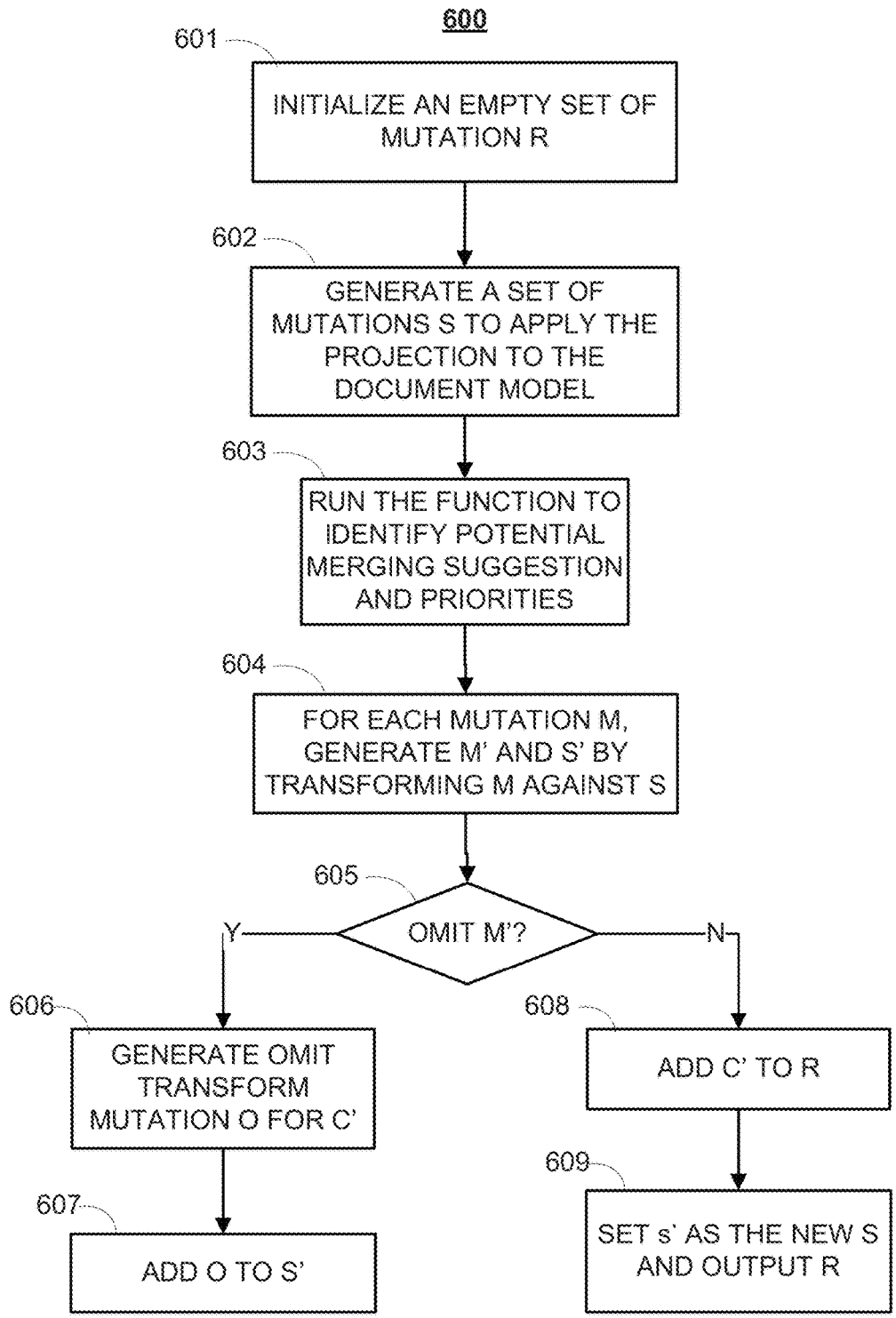
FIG. 6 shows an example logic flow diagram 600 illustrating aspects of defining an omit transform mutation for a document model, according to an illustrative embodiment.

FIG. 6 shows an example logic flow diagram 600 illustrating aspects of defining an omit transform mutation for a document model. The technique may be summarized as below.

Initialize an empty set of mutations R, at 601.
Generate the set of mutations S used to apply the projection to the current model, at 602.
For each mutation M in the set of mutations to broadcast:
Generate M' and S' by transforming M against S at 603.
If M' should be omitted due to the projection at 605:
Generate the omit transform mutation O for C' at 606.
Add O to S' at 607.
Else:
Add C' to R at 608.
Set S' as the new S at 609.
R is the result.

To summarize, when defining a projection, one may define (1) given a model which mutations apply the projection and (2) which mutations should be omitted and what the omit transform mutations are for those. Once those are defined, then the systems and methods of the present disclosure may be used to collaboratively broadcast mutations under the projection.

There are a few advantages to solving the problem in this manner. First, the present disclosure allows projections to be entirely applied server-side, allowing enforcing that clients to be under certain projections. Second, the present disclosure makes use of existing operational transformation semantics in real-time collaboration applications.

In an example, projections are applied to filter suggested changes from a version of the document available to viewers. The present disclosure enables for changes to the document to be applied appropriately so that viewers of a document are presented with and up-to-date version of the document. To remove the display of the suggested changes and comments from the "view mode" of the document that is shown viewers, the application engine that implements the view mode of a document may involve any combination of the following steps.

The concept of a projection may be applied to a document model. An example pseudo-code segment illustrating an object class of a projection may take a form similar to the following:

```
public enum Projection {
    // Represents the model as is.
    FULL,
    // Represents the model with suggestions filtered out.
    WITHOUT_SUGGESTIONS
}
public interface Model<T extends Model<T>> {
    ...
    /** Returns a deep copy of this object. Same as
    copy(Projection.FULL) */
    T copy( );
    /** Returns a deep copy of this object with the given projection. */
    T copy(Projection p);
}
```

In order to use these Projections, the ModelState will be modified as follows:

```
public interface ModelState<T extends Model<T>> {
    ...
    /** Returns a model at the specified revision. Includes suggestions. */
    T getModel(int revision, Projection projection) throws IOException;
}
```

Usages will be replaced with the appropriate Projection depending on whether suggestions should always be filtered.

Access control list (ACL)-Based Filtering may be used. Some usages of suggestions will require contextual filtering based on whether the user has view or edit access to the document. To achieve this, a factory may be used to construct the right. An example pseudo-code segment illustrating an object class of an ACL-based filtering may take a form similar to the following:
Projection based on the AccessLevel:

```
public enum Projection {
    // Represents the model as is.
    FULL,
    // Represents the model with suggestions filtered out.
    WITHOUT_SUGGESTIONS
    public static Projection fromAccessLevel(AccessLevel accessLevel);
}
```

The factory will return Projection.FULL for editors and reviewers (commenters) and Projection. WITHOUT_SUGGESTIONS for viewers. Additionally, a default value may be injected for Projection, which will use the factory to return the right projection for the user's AccessLevel.

In another embodiment, change Filtering may be implemented. In some implementations, contextually filtering the model based on AccessLevel may not be sufficient. Usages which load or transmit changes may also need to be filtered. The following steps may be used to filter commands for viewers:

1. Initialize an empty set of commands R.
2. Generate the set of commands S used to filter out the current model suggestions.

3. For each command C in the change:
   a. Generate C' and S' by transforming C against S.
   b. If C' is a suggestion command:
      i. Generate the omit command O for C'.
      ii. Add 0 to S'.
   c. Else:
      i. Add C' to R.
   d. Set S' as the new S.
4. R is the result.

In some implementations, the following method may be used to generate the filter commands (which may be an example pseudo-code segment illustrating step 2 above).

```
public interface Model<T extends Model<T>> {
    ...
    /** Returns a deep copy of this object. Same as
    copy(Projection.FULL) */
    T copy( );
    /** Returns a deep copy of this object with the given projection. */
    T copy (Projection p);
    /**
     * Returns the set of commands that if applied to this model would
    yield
     * given projection. In other words, for some model M and projection
    P:
     * M.getProjectionCommands(P).apply(M)⇔M.copy(P)
     */
    Iterable<Command<T>> getProjectionCommands(Projection p);
}
```

The implementation for Projection.FULL may always return an empty list. Implementations that do not support suggestions, such as Projection. WITHOUT_SUGGESTIONS, may simply return an empty list. In some implementations, the collaborative document editing application may implement Projection. WITHOUT_SUGGESTIONS by producing the set of commands to reject all suggestions currently in the model.

In some implementations, the following method may be used to produce omit commands (which may be an example pseudo-code segment illustrating step 3.b.i. above).

```
public class ProjectionDetails<T extends Model<T>> {
    ...
    /** Whether the Command is included in the Projection. If this is
    false,
     * then applying a Command to a Model with the Projection will
    result in the 3 of 9
     * Model no longer conforming to the Projection.
     */
    boolean isIncludedInProjection( );
    /**
     * If the Command is not included in the Projection, this is the
    Command
     * that should be used to transform future commands due to this
    command
     * being omitted.
     */
    Command<T> getOmitTransformCommand( );
}
public interface Command<T extends Model<T>> {
    ...
    /**
     * Gets the details on how this Command behaves under the given
    Projection.
     */
    ProjectionDetails getProjectionDetails(Projection p);
}
```

This may be implemented as follows:
1. AbstractCommand will return null.
2. WrapperCommands will error on the calls to these, since the details may not be calculated without unwrapping.
3. Suggestion commands will return the appropriate omit command. For example:
   a. InsertSuggestedSpacers will return a DeleteSpacers for the inserted range.
   b. MarkSpacersForDeletion will return an UnmarkSpacersForDeletion for the same range.

This may be implemented in ModelStateImpl and used to transform the commands in changes before the changes are broadcast, as well as to filter the LoadResult before it is returned. This may include the following change to an API change:

```
public interface ModelState<T extends Model<T>> {
    ...
    /**
     * Returns a model at the specified revision with all suggestions
    filtered
     * out.
     */
    LoadResult<T> load(int revision, Projection projection) throws
    IOException;
}
```

In some implementations, commands may be unwrapped before the process, since each command has to be treated differently depending on whether it's a suggestion command or not. In some implementations, the collaborative document editor may not use a validating transformer for this process, since the model at each step is not necessarily valid. In some implementations, collaborator selection Changes use the model at the Change's revision, and saveable Changes use the model at the revision prior.

In some implementations, the present disclosure relies on transformation in order to filter out commands before they are sent to viewers. One concern with this approach is performance. In particular, transformation may slow and may be performed on every save if a document has suggestions and viewers. To address this concern, a performance pass may be done on the transformers. However, since the general approach is n2, the gains may be limited. To avoid worst-case scenarios, the amount of filter commands that are transformed against may be limited, and broadcasting to viewers may be stopped if that limit is reached.

Another concern is that broadcasting may be currently done behind the ModelState lock. To address this, a separate lock may be used, where the separate lock orders broadcasts, but does not block other operations on the ModelState.

In another embodiment, identifying Session AccessLevel may be implemented. In some implementations, in order to determine which sessions need browserchannel filtering, the collaborative document editor application should have information indicative of which sessions are viewer sessions. It may not be sufficient to determine the user's AccessLevel, since the user's level of access may not necessarily match the client's effective access. For example, an editor may select an option to view the document in a view mode or in a reviewer mode rather than an editor mode, or a reviewer may select an option to view the document in a view mode rather than in a reviewer mode. To implement this, a session creation function AppSessionManager may be modified to also receive the session's AccessLevel. There may also be a mechanism to identify which sessions have a given AccessLevel.

In some implementations, in order to populate the AccessLevel, a function SessionInitiationInterceptor may fetch the current user's AccessLevel the session is created. If there are @SessionInitiator endpoints which initiate sessions at a forced lower access level (like/view), then those may be manually overridden. To manually override, a parameter may be added to @SessionInitiator with the optional AccessLevel to use instead of the effective one. Alternatively, the endpoints which result in forced lower access level may be removed, thereby forcing the client to refresh if they can access.

In another embodiment, usages may be categorized according to the following: Usages of Projection. WITHOUT_SUGGESTIONS:
1. Thumbnailing. This should be handled generically via ModelThumbnailer.
2. Indexing. This should be handled generically via Indexer.
3. Social markup. This should be handled generically via Snippeter.
4. Crawler.
5. Document copies.
6. Preview and publish.

Usages of Projection.FULL:
1. Legal discovery and AbuseIAm.
2. Flumes and debug endpoints.
3. Other internal usages: checking for legacy comments, validation, spellcheck, transformation.

Usages of Projection.fromAccessLevel:
1. Endpoints only available to editors: Link editing, Revert, Maestro RPCs, Revision history
2. Offline sync: ModelAction
3. Export. This may be handled generically via Exporter.

Some usages may be based on the effective access for the current session. Mechanisms may be in place to ensure that the session and the access level are kept consistent or handle these separately:
1. SessionInitiator actions and their effective access:
 a. fromAccessLevel: Edit, Comment
 b. WITHOUT_SUGGESTIONS: View, NativeWebView
2. Usages which require the effective access for the session:
 a. Initial load model fonts.
 b. Print and print preview.
 c. Model catchup requests.
 d. Command broadcasting.

Below are some examples of the techniques described herein in practice:

Setup:
Model and indices:
  Hello_awesome_world // "awesome_" is a suggestion
  0123456789012345678
Viewer model and indices:
  Hello_world // Viewer doesn't see the suggestion.
  01234567890

Example #1: Applying a regular command after a suggestion.
Change:
  [Insert "!" @ 19 // Insert "!" after "world"
Steps:
  1. R = [ ]
  2. S = [Delete 6-13]
  3. Process the first command:
     a. C' = [Insert "!" @ 11]
        S' = [Delete 6-13]
     b. R = [Insert "!" @11] // C' isn't a suggestion, so add it to R.
Resulting editor model:
  Hello_awesome_world!
Resulting viewer model:
  Hello_world!

Example #2: Applying a suggested and a regular command after a suggestion.
Change:
  [
     SuggestInsert "," @ 5, // Suggest inserting "," after "Hello"
     Insert "!" @ 19 // Insert "!" after "world"
  ]
Steps:
  4. R = [ ]
  5. S = [Delete 6-13]
  6. Process the first command:
     a. C' = [SuggestInsert "," @ 5]
        S' = [Delete 6-13]
     b. O = [Delete 5-5] // C' is a suggestion, so omit it.
     c. S = S' = [Delete 6-13, Delete 5-5]
  7. Process the second command:
     a. C' = [Insert "!" @ 10]
        S' = [Delete 6-13, Delete 5-5]
     b. R = [Insert "!" @ 10] // C' isn't a suggestion, so add it to R.
Resulting editor model:
  Hello,_awesome_world!
Resulting viewer model:
  Hello_world!

In some implementations, instead of using operational transformation to transform commands before being sent to viewers, the commands may be anonymized before being sent down and then relying on the client to properly transform them. This implementation may be undesired because it may involve a larger and more complicated change. In particular, anonymization may require both the command and the model pre-application of the command, so it would have to be done at apply time. Commands sent to the client in other paths such as delta changes would require application. Furthermore, the anonymization system would need to be built without destroying the command's operational transformation (and possibly application) semantics. This may have a negative impact on client performance (including mobile). In particular, transforms on the client may have an even worse performance impact for users, and approaches for handling this cleanly on the client-side may require changing offline storage.

Another embodiment of the systems and methods described herein include a notification mechanism to notify users of changes to the documents by collaborators. In an online collaborative document editing application, editors generally wish to have control over their documents and for collaborators to work them. Editors want to know who has modified their document, when it was modified, and what was changed. The systems and methods of the present disclosure address this problem by providing a way for the editor to be notified (as well as users who have subscribed to notifications) about changes to their document that have been made by collaborators, along with a summary of the changes.

Figure 7:
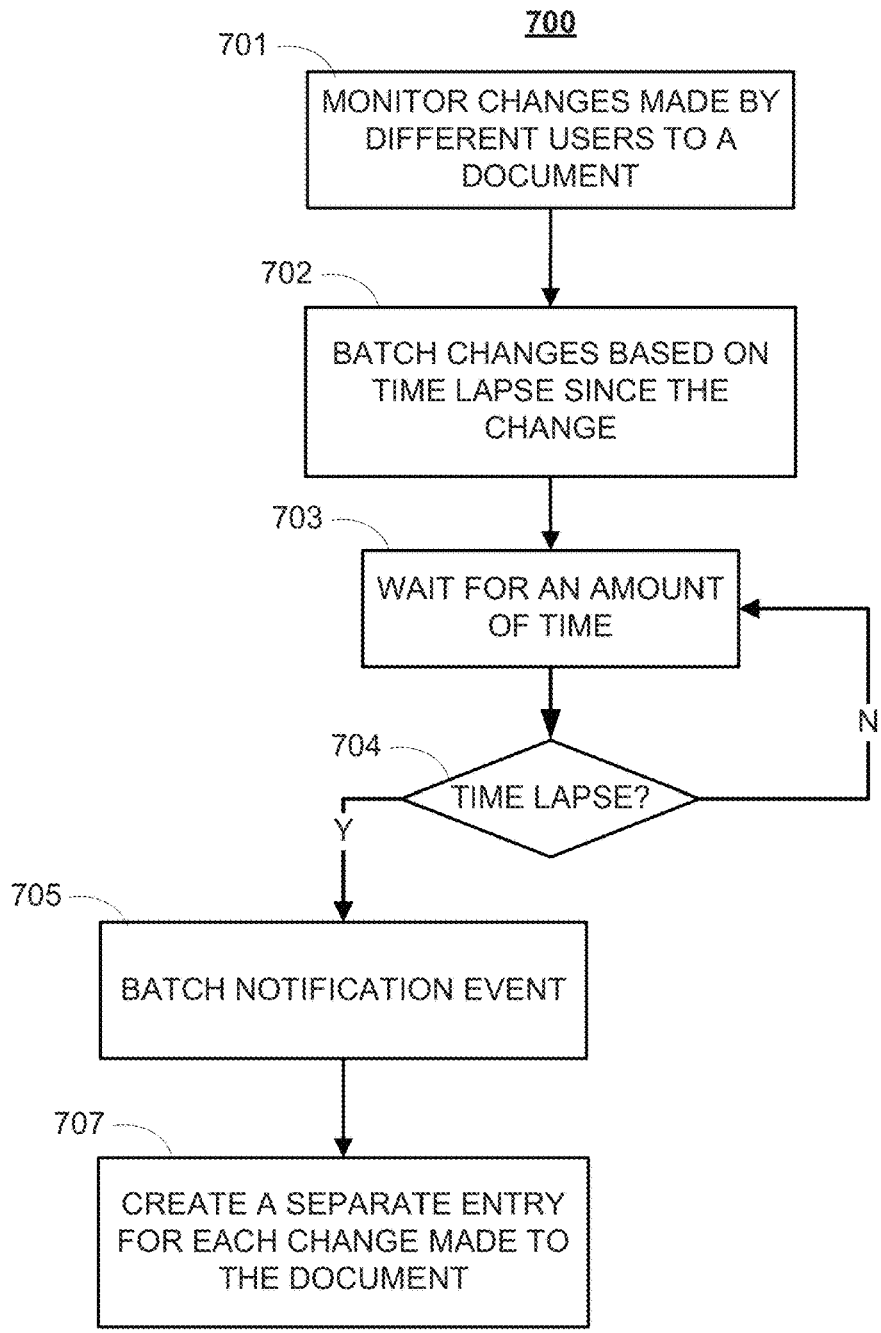
FIG. 7 provides an example logic flow diagram 700 illustrating aspects of notifying editors of changes to a collaborative document by collaborators, according to an illustrative embodiment.

FIG. 7 provides an example logic flow diagram 700 illustrating aspects of notifying editors of changes to a collaborative document by collaborators. Existing systems may track changes that different users have made to a document, but do not provide notifications of changes or summaries of the changes to the users, at 701. In one embodiment, changes that have been made by collaborators can be batched based on amount of time passed since the change, at 702. An email or message is sent to the document owner and users who have opted to subscribe to notifications. The email or message may contain changes from multiple collaborators during a given time period. Each change in the message may include various data, such as the author, the time the change was made, and a description of the change. Changes may be made by other editors or by collaborators who do not have full edit rights, such as reviewers. The changes made by reviewers may be recorded as "suggestions" and require approval by an editor before being applied to the document. In some implementations, editors may accept or reject these changes directly from the email or message by selecting the appropriate option.

In some implementations, as each change is made to a document, the change is sent to a notification software system that tracks the change event by document and recipient. The document owner is subscribed to notifications by default, and other collaborators may also subscribe to the notifications. Changes made in the same area of the document or at the same time may be grouped together. The notification software system then waits a configurable amount of time, which may be based on whether the recipient is currently viewing the document or not, at 703.

Once the appropriate time has passed at 704, all the notification events for that recipient and document are batched together and processed at 705. For each change made to the document, a separate entry may be created (at 706) that lists the author, the timestamp of the change that was last made, and a textual description of the change.

In some embodiments, the present disclosure includes features for ensuring editors are not over-notified. Changes that have been reverted and/or are no longer present in the document may be ignored, and the notification for such changes may be suppressed. For example, if a collaborator makes a change to the document and the time period passes, the editor may receive an email describing the change. However, the notification of the change may be suppressed if the collaborator uses the undo functionality, manually undoes the change, or if the section of the document the change resides in was deleted by the editor.

Using different time periods based on whether an editor who is viewing the document allows editors who are actively viewing the document to take action on edits by users and prevent a redundant notification to be sent out while still sending timely notifications of changes. In an example, the time period may be longer if the editor is actively viewing the document, and may be shorter if the editor is not actively viewing the document.

The systems and methods described herein provide a human-readable explanation of changes made to a document and provide the editor with information that may be used to decide whether to view the document now, later, or never. Such a determination may not be possible when the editor is only provided with a timestamp that must be manually checked, or when the editor must rely on collaborators to inform the editor that changes exist and what the changes include.

Embodiments described herein present several advantages over existing systems. For example, the notification system described herein means that editors do not need to be manually notified by collaborators when the collaborators have made changes. Similarly, editors do not need to take action themselves to find out about changes because the emails or messages are sent out in minutes after the collaborator's change. Moreover, including a description of the change in the message gives the editor context regarding the changes. Simply providing a timestamp update is not enough information for the editor to decide if investigation of changes is warranted. The present disclosure provides information to the editor to let him better manage his time between multiple tasks, including the document undergoing collaboration.

In some implementations, the message may not only include the textual description, but also a rendering of the change in context with the rest of the document. For example, if a collaborator replaced some text with new text, not only would the description in the message say "Replace 'end' with 'a final part of something'", but the surrounding few lines, words, or sentences of the document may also be included in the message.

In some implementations, a summary of the changes may be included in the message notification. The following description is an example of a process for notifying editors and subscribers of changes in a document. A CommentNotificationListener may listen for events, which may occur any time a comment or reply is created, updated, or deleted. The events may be processed, and a notification payload may be created (if the circumstances warrant notifying). A notifier may then package the notification payload and sends it a messaging system, which receives the payload and adds it to a bucket of (document, recipient). The bucket may be held for a configurable amount of time (e.g., such as 5 minutes if the document is closed, 15 minutes if the document is open by the user to be notified). As more comments or replies are added or updated, they get added to the same bucket of (document, recipient). When the time period has passed, the messaging system takes all the payloads in a given bucket and sends this to a message processor configured to handle the bucket. The message processor passes the bucket to an event processor, which processes the notification events, filters out events that should not be sent, groups the events by comment id, and translates the events into html and text message bodies.

While various embodiments described herein have been shown, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure.

Another embodiment of the systems and methods described herein include a notification mechanism to notify users of changes to the documents by collaborators. A document editor application may allow users to make edits as suggestions, which are tracked and have to be accepted or rejected before they are incorporated into the document. In doing so, the document editor needs a mechanism to convert any arbitrary edit into a suggestion version. It is desirable to have an automatic conversion mechanism that can generically convert existing edits without having to manually implement conversion logic for each edit. This allows all existing controller business logic to be leveraged, including any future logic that is written.

As discussed in connection with FIG. 6, changes to the document model may be described via a series of incremental atomic mutations. In a word processor, mutations might include insert characters, deleting characters and applying styles. A single user edit to the document might result in multiple mutations being applied to the model. A word processor would have business logic determining what mutations to apply to the model based on the user's action and the current state of the application.

Figure 8:
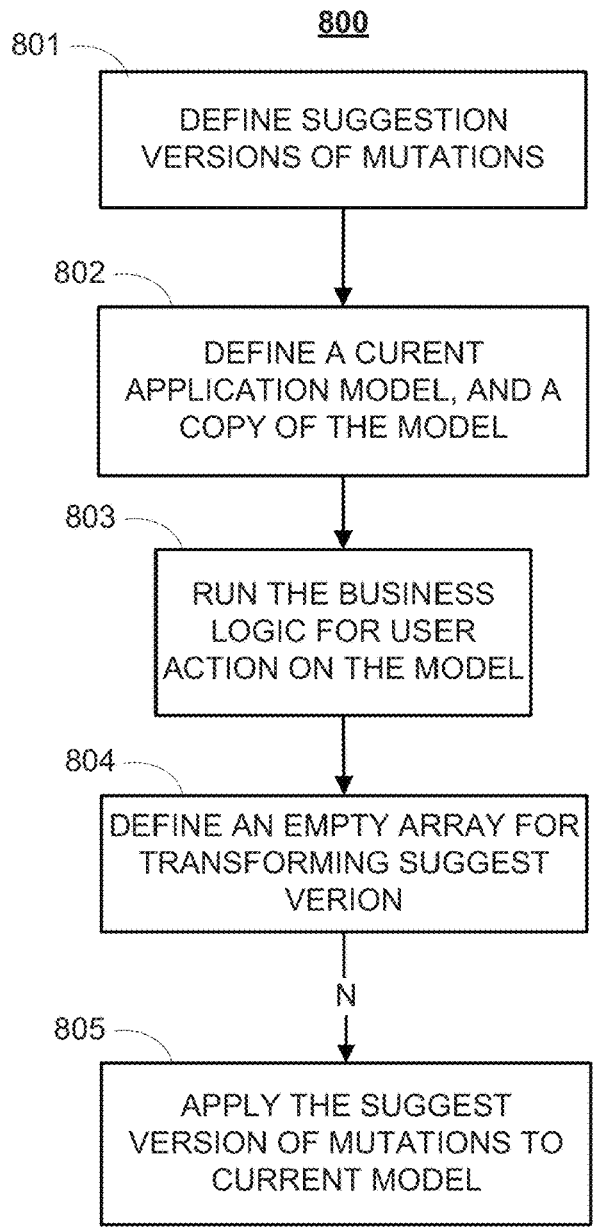
FIG. 8 provides an example logic flow diagram 800 illustrating aspects of converting edits into a suggestion, according to an illustrative embodiment.

FIG. 8 provides an example logic flow diagram 800 illustrating aspects of converting edits into a suggestion. Starting at 801, the application defines suggest versions of its mutations in order to identify suggested objects in the application model at 801. For example, a word processor might have an insert characters mutation and an insert suggested characters mutation. Then, the application needs to define functions to convert from the regular version to the suggest version. In the previous example, that would be a function converting from insert characters to insert suggested characters. If the suggest mutation has different application semantics from the original mutation, then the suggest transform mutation must also be provided.

These mutations will be used to transform future mutations, in order to account for the differing semantics. For example, a word processor might have a delete characters mutation whose suggest version is mark characters for deletion. However, marking the characters for deletion doesn't actually delete them-it just creates a suggestion to delete them. For example, the user performs a drag drop, which is represented as a delete characters at index 100 and insert characters at index 200. A naive conversion would convert these into mark characters for deletion at index 100 and insert characters at index 200. However, the index of original insertion assumed that the characters had already been deleted. Therefore, an insert characters at 100 as the suggest transform mutation can be defined. Transforming the insert characters at 200 against that causes it to shift forward to the correct location for the insertion.

Once these semantics have been defined for the given application's model, then a suggestion can be produced based on the following steps:

1. Define M as the current application Model (at 802)
2. Make a copy of M to produce M' (at 802)
3. Run the business logic for the user's current action on M'. Collect the mutations applied to M' as a result of that logic into an array A (at 803).
4. Define an empty array T (at 804).
5. For each mutation C in A:
   a. Produce S, the suggest version of C, via the application-specific function
   b. Produce F, the suggest transform mutation for C, via the application-specific function
   c. Transform S against T to produce S' and T'
   d. Set T=T'
   e. Add F to T
   f. Apply S' to M.

This will apply the suggest version of the mutation to the current model (at 805). After the method is complete, the current model will have had the suggest version of the user action applied to it.

When defining the function to produce suggest mutations, it may be useful to consider the ownership of the objects being affected. For example, if the user backspaced a suggested word, that word should be deleted, but if a non-suggested word was backspaced, it should be marked for deletion. To achieve this, define the concept of mutation ownership. Ownership can be in one of three states: owned, partially owned or not owned. During step (3) of the method above, the ownership for each mutation is calculated based on the objects in the model that it affects. For example, a mutation deleting text would be owned if the text is a suggestion by the current user, not owned if not and partially owned if only some of the deleted text is a suggestion by the current user. Then, during step (5.a) the pre-calculated ownership can be used during the conversion process. For a mutation deleting characters, that ownership could be used to disambiguate whether to convert into a mark characters for deletion or leave it as a delete characters.

The ownership may also be aggregated across mutations of similar types during step (3). By looking at this aggregate ownership, one may make a decision cross-cutting particular mutations when converting. This may be useful, for example, if the application allows for discontinuous selection and it is desirable to either consistently delete the text or mark it for deletion.

Solving the problem in this manner has the following advantages:

1. It is a generic solution regardless of the application-specific business logic. It only requires defining conversion functions for the mutations in the application. This minimizes the cost to implement.
2. Since it works regardless of application-specific business logic, it requires less maintenance when the application is extended or modified with new business logic.
3. It is straightforward to extend suggestions to new objects in the model. Only has to only define the conversion functions for the mutations representing changes to those objects.

In order to produce suggestion commands, an interface SuggestCommandProvider can be introduced having a registry via the CommandRegistry. Another interface SuggestTransformCommandProvider can be adopted, which will create commands providing a mapping between the commands and suggestion commands. Example pseudo-code segment illustrating SuggestCommandProvider and SuggestTransformCommandProvider can take a form similar to the following:

```
/** Creates suggestion versions of commands. */
interface docs.commands.SuggestCommandProvider {
/**
* Gets the corresponding suggestion command for the given command,
with the given
* suggestion id.
*/
SuggestCommand provideSuggestCommand(command, id, model)
}
interface docs.commands.SuggestTransformCommandProvider {
/**
* Given a suggest command, returns a command to be used to transform
future
* suggestions within the same Edit. This command will account for
differing semantics
* between commands and suggestion commands as returned by
getSuggestCommand.
*/
Command provideSuggestTransformCommand(command)
}
class docs.commands.CommandRegistry implements
docs.commands.SuggestCommandProvider,
docs.commands.SuggestTransformCommandProvider {
/** @override */
Command provideSuggestCommand(command, id, model)
/** @override */
Command provideSuggestTransformCommand(command)
}
/** Registers a SuggestCommandProvider */
void registerSuggestCommandProvider(type, provider)
/** Registers a SuggestTransformCommandProvider */
void registerSuggestTransformCommandProvider(type, provider)
}
```

The document model may make a copy of the context so as to apply the original edit without modifying the actual ModelState. To do so, a suggest changes specific interface that copies the context can be created. This is not a generic context copier since it will do things particular to the usage in suggest changes, such as creating a no-op inverter.

```
/** Copies contexts. */
interface docs.edits.ContextCopier {
/**
 * Creates a copy of the given context to be used by the SuggestEdit.
 */
Context copy(context)
}
/** Copies the docs/text context for use in the SuggestEdit. */
class docs.textedits.SuggestContextCopier implements
docs.edits.ContextCopier
(commandApplier, selectionTransformer) {
/** @override */
Context copy(context) {
var model = context.getModelState( ).getModel( ).copy( );
var selectionModel = new docs.text.model.SelectionModelImpl(
context.getErrorReporter( ), model);
selectionModel.setSelection(
context.getModelState( ).getSelectionModel( ).getSelection( ));
var modelState = new docs.text.edits.ModelState(
model,
selectionModel,
commandApplier,
new NoOpCommandInverter( ),
selectionTransformer);
return new docs.text.edits.Context(
modelState,
context.getLinkDefaults( ),
context.getErrorReporter( ));
}
interface docs.text.model.Model {
/** Copies this Model. */
Model copy( )
}
class docs.text.model.ModelImpl implements docs.text.model.Model {
/** @override */
Model copy( ) {
var newModel = new ModelImpl(
this.errorReporter_,
this.styleResolvers_,
this.concreteStyleUpdaters_,
this.entityConcreteStyleUpdaters_,
this.entityResolvers_,
this.enabledStyleTypes_,
this.contentClassifier_);
this.copyTo(newModel);
return newModel;
}
}
class docs.text.model.ModelWrapper implements docs.text.model.Model
{
/** @override */
Model copy( ) {
return this.modelProviderFn_.copy( );
}
}
```

In order to do the SelectionModel copy outlined above, SelectionTreeGenerator and SelectionDocumentSliceGenerator will be removed from the SelectionModel and moved to a helper class:

```
class docs.text.dom.DocumentSliceGenerator(
selectionTreeGenerator, selectionDocumentSliceGenerator) {
/** Creates a document slice representing the given selection in the given
model. */
DocumentSlice createDocumentSlice(model, selection) {
var root = this.selectionTreeGenerator_.generateTree(
model.getSpacers( ), selection.getSelectedRanges( ));
return this.selectionDocumentSliceGenerator_.generate(
model, selection, root);
}
}
```

In order to introduce a SuggestEdit, IdUtil can be moved from docs.text.util to docs.util. Below is an outline of the two new classes:

```
/** Provides suggest edits. */
class docs.edits.SuggestEditProvider implements docs.edits.EditProvider(
editProvider,
commandTransformer,
selectionTransformer,
suggestCommandProvider,
suggestTransformCommandProvider,
contextCopier) {
Edit provideEdit(context) {
return new SuggestEdit(
context,
this.editProvider_.provide(
this.contextCopier_.copy(context)),
this.commandTransformer_,
this.selectionTransformer_,
this.suggestCommandProvider_,
this.suggestTransformCommandProvider_);
}
boolean canApply(context) {
return this.editProvider_.canApply(context)
}
}
/** Applies the given edit as a suggestion. */
class docs.edits.SuggestEdit extends docs.edits.AbstractEdit(
context, edit, commandTransformer, selectionTransformer, suggestCommandProvider,
suggestTransformCommandProvider) {
void applyInternal(args) {
var result = this.edit_.apply(args);
var id = docs.util.IdUtil.generateId('suggest');
var transformCommands = [ ];
for each command in result.getCommands( ) {
// Have to unwrap because provideSuggestCommand takes in the model.
if (command.isWrapper( )) {
for each innerCommand in command.unwrap( ) {
this.applySuggestCommand_(innerCommand, transformCommands);
}
} else {
```

```
this.applySuggestCommand_(command, transformCommands);
}
}
this.applySelection(this.selectionTransformer_.transformSelection(
result.getSelectionAfter( ), transformCommands));
}
private void applySuggestCommand_(command, transformCommands) {
var suggestCommand = this.suggestCommandProvider_.provideSuggestCommand(
command, id, model);
var pair = this.transformer_.transformBoth([suggestCommand], transformCommands);
transformCommands = pair.getCommands( );
assert(pair.getCommandsToWin( ).length == 1);
var transformedSuggestCommand = pair.getCommandsToWin( )[0];
var newTransformCommand =
this.suggestTransformCommandProvider_.provideSuggestTransformCommand(
suggestCommand);
// Unwrap for performance since this newTransformCommand will often be a NullCommand.
var newTransformCommands = newTransformCommand.isWrapper( ) ?
newTransformCommand.unwrap( ) : [newTransformCommand];
goog.array.extend(transformCommands, newTransformCommands);
this.applyCommand(transformedSuggestCommand);
}
}
```

Note that the applySelection call in SuggestEdit.applyInternal is not properly propagating "scroll into view" and the selection change reason. This will be covered in future work, for now those will be dropped.

The SuggestEditProvider needs to be used wrapping the regular EditProvider whenever the app is in suggestions mode. This will be achieved by introducing a SuggestEditApplier wrapper:

```
/** Provides suggest edits. */
class docs.edits.SuggestEditApplier implements
docs.edits.EditApplier(delegate,
commandTransformer, selectionTransformer, suggestCommandProvider,
suggestTransformCommandProvider, contextCopier) {
/** @override */
void apply(editProvider, args) {
if (this.suggestionsMode_) {
editProvider = new SuggestEditProvider(
editProvider,
commandTransformer,
selectionTransformer,
suggestCommandProvider,
suggestTransformCommandProvider,
contextCopier);
}
this.delegate_.apply(editProvider);
}
void setSuggestionsMode(enabled) {
this.suggestionsMode_ = enabled;
}
}
```

This allows intercepting all edit providers being applied and wrap them as appropriate. The undo or regular redo may not need to be intercepted since those will correctly apply the commands from the SuggestEdit result. Additionally, the magic redo may not need to be intercepted since the saved provider will already be the correct one. The SuggestEditApplier will be created in collaborative documents behind the suggest changes flag. If the user is in comment mode, then setSuggestionsMode will be enabled.

Figure 9:
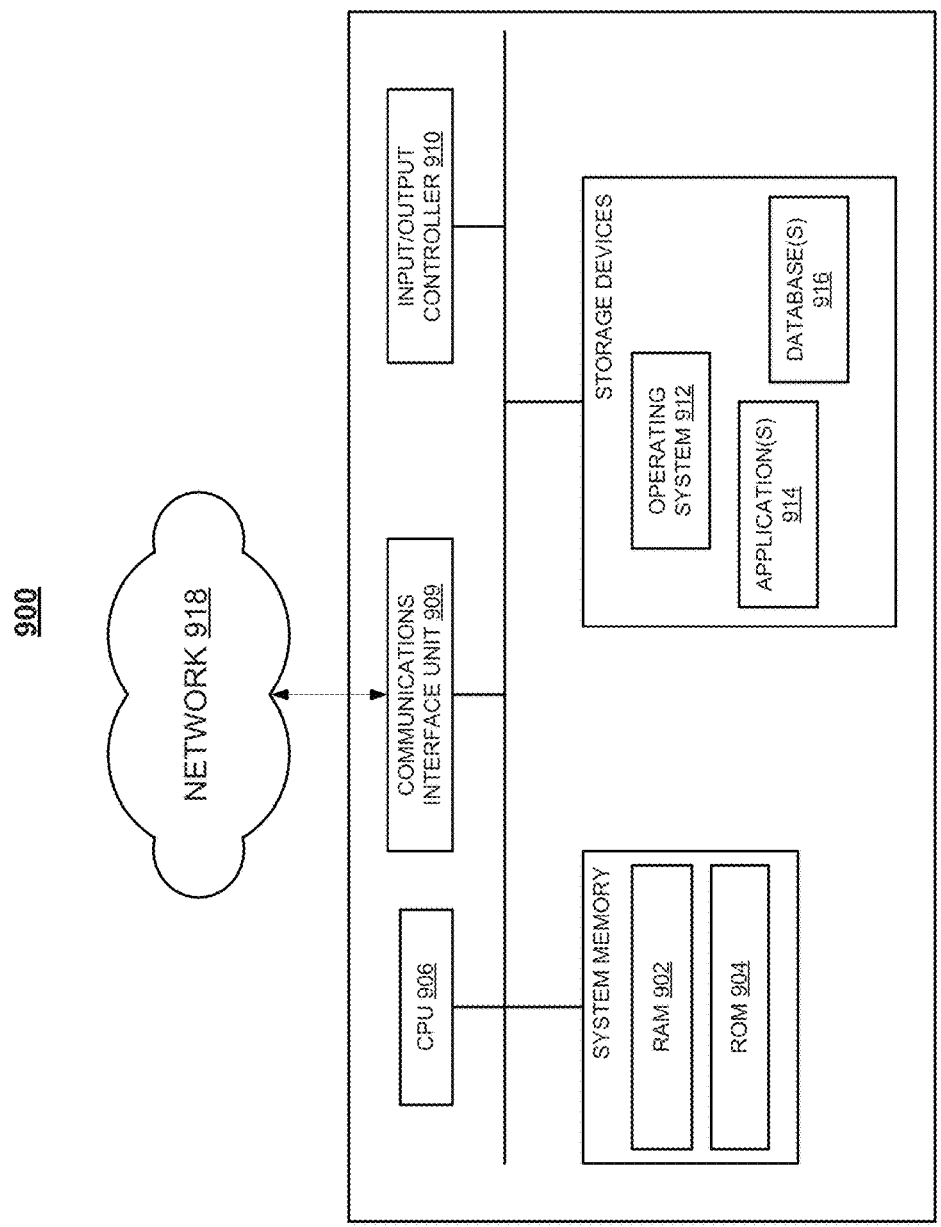
FIG. 9 is a schematic diagram of an exemplary computer system employed in accordance with one or more implementations of the disclosure.

FIG. 9 is a block diagram illustrating an exemplary computer system 900 with which the system for managing suggested edits in a document and use of FIGS. 1-8 can be implemented. In certain aspects, the computer system 900 may be implemented using hardware or a combination of software and hardware, either in a dedicated server, or integrated into another entity, or distributed across multiple entities.

Computer system 900 includes a bus 908 or other communication mechanism for communicating information, and a processor 902 coupled with bus 908 for processing information. By way of example, the computer system 900 may be implemented with one or more processors 902.

Computer system 900 can include, in addition to hardware, code that creates an execution environment for the computer program in question, e.g., code that constitutes processor firmware, a protocol stack, a database management system, an operating system, or a combination of one or more of them stored in an included memory 904, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 908 for storing information and instructions to be executed by processor 902. The processor 902 and the memory 904 can be supplemented by, or incorporated in, logic circuitry.

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more location without deviating from the scope of the disclosed subject matter. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure.

Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various techniques identified and described above may be varied, and that the order of techniques may be adapted to particular applications of the techniques disclosed herein. All such variations and modifications are intended to fall within the scope of this disclosure. As such, the depiction and/or description of an order for various techniques should not be understood to require a particular order of execution for those techniques, unless required by a particular application, or explicitly stated or otherwise clear from the context.

The methods and/or processes described above, and techniques thereof, may be realized in hardware, or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application-specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The instructions may be stored in the memory 904 and implemented in one or more computer program products, i.e., one or more modules of computer program instructions encoded on a computer readable medium for execution by, or to control the operation of, the service, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python).

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 900 further includes a data storage device 906 such as a magnetic disk or optical disk, coupled to bus 908 for storing information and instructions. Computer system 900 may be coupled via an input/output module 910 to various devices. The input/output module 910 can be any input/output module. Example input/output modules 910 include data ports such as USB ports. The input/output module 910 is configured to connect to a communications module 912. Example communications modules 912 include networking interface cards, such as Ethernet cards and modems. In certain aspects, the input/output module 910 is configured to connect to a plurality of devices, such as an input device 914 and/or an output device 916. Example input devices 914 include a keyboard and a pointing device, e.g., a mouse or a trackball, by which a user can provide input to the computer system 900. Other kinds of input devices 914 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 916 include display devices, such as a CRT (cathode ray tube) or LCD (liquid crystal display) monitor, for displaying information to the user.

According to one aspect of the present disclosure, the system for managing suggested edits in a document model as shown in FIGS. 2A-7, can be implemented using a computer system 900 in response to processor 902 executing one or more sequences of one or more instructions contained in memory 904. Such instructions may be read into memory 904 from another machine-readable medium, such as data storage device 906. Execution of the sequences of instructions contained in main memory 904 causes processor 902 to perform the processes described herein. One or more processors in a multi-processing arrangement may also be employed to execute the sequences of instructions contained in memory 904. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a personal area network (PAN), a local area network (LAN), a campus area network (CAN), a metropolitan area network (MAN), a wide area network (WAN), a broadband network (BBN), the Internet, and the like. Further, the communication networks can include, but are not limited to, for example, any one or more of the following network topologies, including a bus network, a star network, a ring network, a mesh network, a star-bus network, tree or hierarchical network, or the like. The communications modules can be, for example, modems or Ethernet cards.

As discussed above, computing system 900 can include clients and servers. A client and server are generally remote from each other and typically interact through a communication network. The relationship of client and server arises by virtue of computer programs running on the respective computers and having a client-server relationship to each other. Computer system 900 can be, for example, and without limitation, an enterprise server or group of servers, one or more desktop computers, one or more laptop computers, etc. Computer system 900 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions to processor 902 for execution. Such a medium may take many forms, including, but not limited to, non-volatile media, volatile media, and transmission media. Non-volatile media include, for example, optical or magnetic disks, such as data storage device 906. Volatile media include dynamic memory, such as memory 904. Transmission media include coaxial cables, copper wire, and fiber optics, including the wires that comprise bus 908. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

While this specification contains many specifics, these should not be construed as limitations on the scope of what may be claimed, but rather as descriptions of particular implementations of the subject matter. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A method of managing suggested edits in a collaborative document, the method comprising:
    instantiating a document model having a plurality of document parameters in a structured format that represents the collaborative document;

receiving a first suggested edit to a content element within the collaborative document, wherein the first suggested edit is associated with a first user and is presented in a body of the collaborative document;

responsive to determining that the document model is associated with a suggestions mode that allows the first user to suggest changes within the document model, converting the first suggested edit into a set of suggestion commands comprising:
- a document model command for a document model operation applicable to the document model, the document model command including a first identifier,
- an acceptance command relating to the document model operation, and
- a rejection command relating to the document model operation,
- wherein the document model operation is to provide the first edit first suggested edit as a suggestion on the document model wherein the acceptance command and the rejection command also include the first identifier and wherein an order for executing the set of suggestion commands is defined by a user response to the first suggested edit rather than being predetermined;

applying the document model command on the document model to present the first suggested edit within the collaborative document, wherein applying the document model command on the document model comprises modifying one or more of the plurality of document parameters based on the document model operation;

receiving a user response indicating an acceptance of the first suggested edit, the user response indicating the acceptance being associated with the first identifier, wherein the user response is associated with an editor who is authorized to accept or reject the suggested edits; and in response to the received user response indicating the acceptance, applying the acceptance command, which includes the first identifier, to the document model to update the collaborative document in accordance to the first suggested edit.

2. The method of claim 1, further comprising:
verifying an authority status of the first user, wherein the authority status includes any of:
a reviewer who is authorized to view, make suggested edits and provide comments on the collaborative document;
the editor who is authorized to accept or reject the suggested edits and delete comments made by the reviewer; or
a viewer who is authorized to view a clean published version of the collaborative document without indication of suggested edits or comments.

3. The method of claim 1, wherein the first suggested edit includes any of:
inserting an object into the document model;
deleting the object from the document model;
modifying a property attached to the object in the document model;
moving the object within the document model; or
replacing the object in the document model with another object.

4. The method of claim 1, wherein a first suggestion command invokes a marking or annotation illustrating a suggested edit.

5. The method of claim 1, wherein the acceptance indication is received from a second user different from the first user.

6. The method of claim 1, further comprising:
receiving a second suggested edit to the collaborative document;
applying a second suggestion command on the document model to present the second suggested edit within the collaborative document;
receiving a rejection indication for the second suggested edit; and
removing the second suggested edit from the collaborative document.

7. The method of claim 1, further comprising:
receiving a filter command for the document model;
applying the filter command on the document model to create a new document model; and
presenting a view of the new document model via a user interface while preserving the document model.

8. The method of claim 7, wherein the new document model is a copy of the document model.

9. The method of claim 1, further comprising:
receiving a second suggested edit to the collaborative document;
determining that the second editing suggestion second suggested edit is created within the first suggested edit based on the first identifier associated with the first suggested edit and a second identifier associated with the second suggested edit; and
compounding the first and the second suggested edit.

10. The method of claim 1, further comprising:
receiving a second suggested edit to the collaborative document;
determining that the second suggested edit is conflicting with the first suggested edit; and
presenting the first suggested edit and the second suggested edit via a user interface.

11. The method of claim 1, wherein the first suggested edit is presented in a format that includes information regarding any of: an identity of the first user, a suggestion timestamp, metadata explaining what the first suggested edit is, or an acceptance or rejection status of the first suggested edit.

12. The method of claim 1, further comprising:
determining a mutation associated with the first suggested edit;
defining a priority list of potential editing suggestions within the document model for the mutation to be merged with;
examining whether the mutation is to be merged with at least one potential editing suggestion from the priority list based at least in part on a priority level of the at least one potential editing suggestion and the mutation;
merging the first suggested edit with the at least one potential editing suggestion when the mutation is to be merged; and
presenting the first suggested edit as a new editing suggestion when the mutation is not to be merged.

13. The method of claim 12, further comprising:
determining the first identifier associated with the first suggested edit; and
merging the mutation with the at least one potential editing suggestion when the at least one potential editing suggestion is associated with a same identifier as the first identifier.

14. The method of claim 1, further comprising:
determining one or more mutations associated with the first suggested edit;

defining a projection associated with the one or more mutations;

updating the document model with the projection;

determining a first mutation in contrast to the projection from the one or more mutations; and presenting the updated document model without applying an other mutation of the one or more mutations.

15. The method of claim 14, wherein the projection is defined based on the document model on which the one or more mutations apply, and which mutations from the one or more mutations to be omitted.

16. The method of claim 1, further comprising:

identifying a first change from the first user to the document model;

batching the first change at a first timestamp without sending a notification of a collaborator in real-time; and collecting and sending a notification relating to the first change at a second timestamp to the collaborator, wherein the second timestamp is later than the first timestamp.

17. The method of claim 16, further comprising:

identifying a second change between the first timestamp and the second timestamp;

determining that the second change offsets the first change; and excluding the first change from the notification.

18. The method of claim 1, further comprising:

receiving the first suggested edit in the document model;

defining a suggestion version of a mutation associated with the first suggested edit;

determining an ownership with the mutation based on an object in the document model, wherein the object is affected by the mutation;

determining a second suggested edit based on the suggestion version of the mutation;

converting the first suggested edit to the second suggested edit; and updating the document model with the second suggested edit.

19. A system for managing suggested edits in a collaborative document, the system comprising:

a memory; and a processing device, coupled to the memory to:

instantiate a document model having a plurality of document parameters in a structured format that represents the collaborative document;

receive a first suggested edit to a content element within the collaborative document, wherein the first suggested edit is associated with a first user and is presented in a body of the collaborative document;

responsive to determining that the document model is associated with a suggestions mode that allows the first user to suggest changes within the document model, convert the first suggested edit into a set of suggestion commands comprising:

a document model command for a document model operation applicable to the document model, the document model command including a first identifier, an acceptance command relating to the document model operation, and a rejection command relating to the document model operation, wherein the document model operation is to provide the first suggested edit as a suggestion on the document model, wherein the acceptance command and the rejection command also include the first identifier, and wherein an order for executing the set of suggestion commands is defined by a user response to the first suggested edit rather than being predetermined;

apply the document model command on the document model to present the first suggested edit within the collaborative document, wherein to apply the document model command on the document model, the processing device is to modify one or more of the plurality of document parameters based on the document model operation;

receive a user response indicating an acceptance of the first suggested edit, the user response indicating the acceptance being associated with the first identifier, wherein the user response is associated with an editor who is authorized to accept or reject the suggested edits; and in response to the received user response indicating the acceptance, apply the acceptance command, which includes the first identifier, to the document model to update the collaborative document in accordance to the first suggested edit.

20. A non-transitory computer-readable medium storing instructions for managing suggested edits in a collaborative document, the instructions when executed by a processor cause the processor to perform operations comprising:

instantiating a document model having a plurality of document parameters in a structured format that represents the collaborative document;

receiving a first suggested edit to a content element within the collaborative document, wherein the first suggested edit is associated with a first user and is presented in a body of the collaborative document;

responsive to determining that the document model is associated with a suggestions mode that allows the first user to suggest changes within the document model, converting the first suggested edit into a set of suggestion commands comprising:

a document model command for a document model operation applicable to the document model, the document model command including a first identifier, an acceptance command relating to the document model operation, and a rejection command relating to the document model operation, wherein the document model operation is to provide the first suggested edit as a suggestion on the document model wherein the acceptance command and the rejection command also include the first identifier, and wherein an order for executing the set of suggestions commands is defined by a user response to the first suggested edit rather than being predetermined;

applying the document model command on the document model to present the first suggested edit within the collaborative document, wherein applying the document model command on the document model comprises modifying one or more of the plurality of document parameters based on the document model operation;

receiving an acceptance indication for the first suggested edit, the acceptance indication specifying the first identifier, wherein the user response to associated with an editor who is authorized to accept or reject the suggested edits; and in response to the received acceptance indication, applying the acceptance command, which includes the first identifier, to the document model to update the collaborative document in accordance to the first suggested edit.

\* \* \* \* \*